(12) United States Patent
Vara et al.

(10) Patent No.: US 11,709,105 B2
(45) Date of Patent: Jul. 25, 2023

(54) FIBER OPTIC SYSTEM FOR DETECTING FORCES ON AND MEASURING DEFORMATION OF AN ANTHROPOMORPHIC TEST DEVICE

(71) Applicant: Humanetics Innovative Solutions, Inc., Farmington Hills, MI (US)

(72) Inventors: Thomas Mathew Vara, Norwalk, OH (US); Ime Victor Ubom, Southfield, MI (US); Michael Scott Beebe, Norwalk, OH (US); Charles Joseph McCarthy, Walled Lake, MI (US); Mark John Burleigh, Hemel Hempstead (GB); James Davis, Commerce Township, MI (US); Robert Lipmyer, Ann Arbor, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 53 days.

(21) Appl. No.: 16/964,489

(22) PCT Filed: Jan. 24, 2019

(86) PCT No.: PCT/US2019/014878
§ 371 (c)(1),
(2) Date: Jul. 23, 2020

(87) PCT Pub. No.: WO2019/147754
PCT Pub. Date: Aug. 1, 2019

(65) Prior Publication Data
US 2020/0348193 A1    Nov. 5, 2020

Related U.S. Application Data

(60) Provisional application No. 62/621,388, filed on Jan. 24, 2018.

(51) Int. Cl.
*G01L 1/24* (2006.01)
*G01L 5/00* (2006.01)
*G09B 23/32* (2006.01)

(52) U.S. Cl.
CPC ............ *G01L 1/246* (2013.01); *G01L 5/0052* (2013.01); *G09B 23/32* (2013.01)

(58) Field of Classification Search
CPC ....... G01L 1/246; G01L 5/0052; G09B 23/32; G01B 11/18
See application file for complete search history.

(56) References Cited

U.S. PATENT DOCUMENTS

| 4,633,079 A | 12/1986 | Rieger |
| 5,134,281 A | 7/1992 | Bryenton et al. |

(Continued)

FOREIGN PATENT DOCUMENTS

| CN | 101036045 A | 9/2007 |
| CN | 101151179 A | 3/2008 |

(Continued)

OTHER PUBLICATIONS

Chinese Search Report for Application CN 2019800189673 dated Nov. 1, 2021, 2 pages.

(Continued)

*Primary Examiner* — Freddie Kirkland, III
(74) *Attorney, Agent, or Firm* — Howard & Howard Attorneys PLLC

(57) ABSTRACT

A system for detecting forces on and measuring deformation of an anthropomorphic test device (ATD) includes a plurality of body parts and at least one optical fiber supported by and in contact with at least one of the body parts. The body parts form the ATD and simulate at least a part of a human body and the articulation of the human body. The optical fiber extends between a first end and a second end and (Continued)

comprises a plurality of sensors disposed between the ends. An emitter is in communication with the optical fiber for emitting a light having a predetermined band of wavelengths through the optical fiber that is reflected by the sensors and an interrogator is in communication with the optical fiber for detecting the reflected light from the sensor such that changes to the reflected light indicate a strain on the at least one body part.

23 Claims, 16 Drawing Sheets

(56) References Cited

U.S. PATENT DOCUMENTS

| | | | |
|---|---|---|---|
| 5,502,301 A | 3/1996 | Lord | |
| 5,701,370 A | 12/1997 | Muhs et al. | |
| 6,016,709 A | 1/2000 | Carnicelli et al. | |
| 6,127,672 A | 10/2000 | Danisch | |
| 6,381,069 B1 | 4/2002 | Riant et al. | |
| 6,471,710 B1 | 10/2002 | Bucholtz | |
| 6,575,757 B1 | 6/2003 | Leight et al. | |
| 6,668,105 B2 | 12/2003 | Chen et al. | |
| 6,816,266 B2 | 11/2004 | Varshneya et al. | |
| 7,027,672 B2 | 4/2006 | Tjin | |
| 7,043,997 B2 | 5/2006 | Mattson et al. | |
| 7,086,273 B2* | 8/2006 | Lipmyer | G01M 17/0078 |
| | | | 73/12.09 |
| 7,508,530 B1* | 3/2009 | Handman | G01S 5/16 |
| | | | 356/624 |
| 7,649,628 B2 | 1/2010 | Wadman | |
| 7,702,190 B2 | 4/2010 | Hao et al. | |
| 7,775,316 B2 | 8/2010 | Hosokawa et al. | |
| 3,009,946 A1 | 8/2011 | Xia et al. | |
| 8,086,430 B2 | 12/2011 | Thomas | |
| 8,213,760 B2 | 7/2012 | Rudenick et al. | |
| 8,244,088 B2 | 8/2012 | Putnam et al. | |
| 8,672,684 B2 | 3/2014 | Ray | |
| 8,700,358 B1 | 4/2014 | Parker, Jr. | |
| 8,746,076 B2 | 6/2014 | Rogge et al. | |
| 8,805,128 B2 | 8/2014 | Wild et al. | |
| 8,909,040 B1 | 12/2014 | Parker, Jr. et al. | |
| 8,970,845 B1 | 3/2015 | Chan et al. | |
| 9,031,368 B2 | 5/2015 | Hayashi | |
| 9,335,482 B2 | 5/2016 | Hao et al. | |
| 9,345,424 B2 | 5/2016 | Wang et al. | |
| 9,355,575 B2* | 5/2016 | Wang | G09B 23/30 |
| 9,360,635 B2 | 6/2016 | Barwicz et al. | |
| 9,417,057 B2 | 8/2016 | Hooft et al. | |
| 9,459,164 B2 | 10/2016 | Arkwright et al. | |
| 9,664,506 B2 | 5/2017 | Parker, Jr. et al. | |
| 9,681,826 B2 | 6/2017 | Dunias et al. | |
| 9,715,838 B2 | 7/2017 | Below et al. | |
| 9,736,597 B1 | 8/2017 | Spiegelberg et al. | |
| 10,946,827 B2 | 3/2021 | Yoshikawa | |
| 2001/0019103 A1 | 9/2001 | Sugai et al. | |
| 2003/0083844 A1* | 5/2003 | Reddi | G01S 5/163 |
| | | | 702/150 |
| 2007/0058163 A1* | 3/2007 | Handman | G01C 15/002 |
| | | | 356/152.1 |
| 2007/0189352 A1* | 8/2007 | Nagahama | C09K 11/77348 |
| | | | 372/71 |
| 2007/0201793 A1 | 8/2007 | Askins et al. | |
| 2011/0239731 A1 | 10/2011 | Lisseman et al. | |
| 2011/0245733 A1 | 10/2011 | Goldbeck et al. | |
| 2011/0249252 A1 | 10/2011 | Lantz et al. | |
| 2013/0090552 A1 | 4/2013 | Ramamurthy et al. | |
| 2013/0327164 A1* | 12/2013 | Wang | G09B 23/30 |
| | | | 73/866.4 |
| 2014/0112615 A1 | 4/2014 | Kreger et al. | |
| 2014/0326078 A1 | 11/2014 | Arkwright et al. | |
| 2015/0230730 A1 | 8/2015 | Sabczynski et al. | |
| 2017/0162077 A1 | 6/2017 | Vara et al. | |
| 2017/0205291 A1 | 7/2017 | Shimada | |
| 2017/0205297 A1 | 7/2017 | Rickman et al. | |
| 2017/0354353 A1 | 12/2017 | Kim et al. | |
| 2018/0033339 A1 | 2/2018 | Kerins et al. | |
| 2018/0128600 A1 | 5/2018 | 'T Hooft | |
| 2018/0160947 A1 | 6/2018 | Hu | |
| 2018/0297214 A1 | 10/2018 | Lessing et al. | |
| 2022/0187146 A1* | 6/2022 | Ramos | G01L 1/246 |
| 2022/0252474 A1* | 8/2022 | Ramos | G02B 6/02128 |

FOREIGN PATENT DOCUMENTS

| | | |
|---|---|---|
| CN | 101491433 A | 7/2009 |
| CN | 202582783 U | 12/2012 |
| CN | 103673791 A | 3/2014 |
| CN | 103674083 A | 3/2014 |
| CN | 104169678 A | 11/2014 |
| CN | 104236627 A | 12/2014 |
| CN | 104321673 A | 1/2015 |
| CN | 104736054 A | 6/2015 |
| CN | 104833525 A | 8/2015 |
| CN | 105136338 A | 12/2015 |
| CN | 105571620 A | 5/2016 |
| CN | 105755950 A | 7/2016 |
| CN | 106959077 A | 7/2017 |
| CN | 107015653 A | 8/2017 |
| CN | 107036543 A | 8/2017 |
| CN | 107249833 A | 10/2017 |
| CN | 108852361 A | 11/2018 |
| CN | 106610273 B | 3/2019 |
| DE | 19532945 A1 | 3/1996 |
| DE | 10215640 A1 | 11/2003 |
| DE | 10333735 A1 | 3/2005 |
| DE | 102013101432 A1 | 8/2014 |
| EP | 1710129 A2 | 10/2006 |
| EP | 2626006 A2 | 8/2013 |
| WO | 00068645 A1 | 11/2000 |
| WO | 2009061181 A1 | 5/2009 |
| WO | 2011066926 A1 | 6/2011 |
| WO | 2014101754 A1 | 7/2014 |
| WO | 2017118949 A1 | 7/2017 |
| WO | 2019147754 A1 | 8/2019 |
| WO | 2019147754 A4 | 10/2019 |

OTHER PUBLICATIONS

English language abstract for CN 101036045 A extracted from espacenet.com database on Nov. 4, 2021, 2 pages.

English language abstract for CN 105136338 A extracted from espacenet.com database on Nov. 4, 2021, 1 page.

English language abstract for CN 107036543 A extracted from espacenet.com database on Nov. 4, 2021, 1 page.

European Search Report for Application EP 19 74 3262 dated Sep. 2, 2021, 2 pages.

English language abstract for DE 102 15 640 A1 extracted from espacenet.com database on Oct. 11, 2021, 1 page.

Bui Z, Robert C. et al., "In-Fiber Bragg Grating Impact Force Transducer for Studying Head-Helmet Mechanical Interaction in Head Impact", Journal of Lightwave Technology, vol. 33, No. 13, Jul. 1, 2015, 8 pages.

Di Sante, Raffaella, Fibre Optic Sensors for Structural Health Monitoring of Aircraft Composite Structures: Recent Advances and Applications, Sensors, vol. 15, ISSN 1424-8220, www.mdpi.com/journal/sensors, Jul. 30, 2015, pp. 18666-18713.

English language abstract for CN 104833525 A extracted from espacenet.com database on Oct. 8, 2020, 1 page.

English language abstract for CN 106610273 B extracted from espacenet.com database on Oct. 8, 2020, 1 page.

English language abstract for CN 202582783 U extracted from espacenet.com database on Oct. 8, 2020, 1 page.

English language abstract for DE 195 32 945 A1 extracted from espacenet.com database on Aug. 20, 2020, 1 page.

HBM, "How Does an Optical Strain Gauge Work?", https://hbm.com/6827/article-how-does-an-optical-strain-gauge-actually-work/, Nov. 30, 2018, 6 pages.

(56) References Cited

OTHER PUBLICATIONS

International Search Report for Application No. PCT/US2019/014878 dated Jun. 20, 2019, 2 pages.
Moore, Jason P. et al., "Shape Sensing Using Multi-Core Fiber Optic Cable and Parametric Curve Solutions", 2012, 7 pages.
Prosser, W.H. et al., "Structural Health Management for Future Aerospace Vehicles", https://ntrs.nasa.gov/search.sp?R=20040200975, 2004, 16 pages.
Reddy, M. et al., "Imbedded Fiber Sensor of Differential Strain in Composites", Review of Progress in Quantitative Nondestructive Evaluation, 1987, pp. 1241-1245.
Richards, W. Lance et al. "NASA Applications of Structural Health Monitoring Technology", NASA, Sep. 2013, 42 pages.
Udd, Eric, "25 Years of Structural Monitoring Using Fiber Optic Sensors", Apr. 15, 2011, 9 pages.
Westbrook, P.S., "Distributed Sensing Over Meter Lengths Using Twisted Multicore Optical Fiber with Continuous Bragg Gratings", 2017, 9 pages.
Yu, Henry Y. et al., "A Test Bed to Examine Helmet Fit and Retention and Biomechanical Measures of Head and Neck Injury in Simulated Impact", J. Vis. Exp., vol. 127, 2017, 18 pages.
International Search Report for Application No. PCT/US2020/019042 dated May 11, 2020, 1 page.
International Search Report for Application No. PCT/US2020/019078 dated May 5, 2020, 1 page.
Talaia, Perdro Miguel de Almeida, "Motorcyclist Biomechanical Model", 2013, 249 pages.
U.S. Appl. No. 17/432,226, filed Aug. 19, 2021.
U.S. Appl. No. 17/432,241, filed Aug. 19, 2021.
Amanzadeh, Moe et al., "Recent Developments in Fibre Optic Shape Sensing", Measurement, vol. 128, Nov. 2018, pp. 119-137.
English language abstract for WO 2014/101754 A1 extracted from espacenet.com database on Nov. 6, 2022, 2 pages.
European Search Report for Application EP 20 75 9871 dated Sep. 27, 2022, 2 pages.
European Search Report for Application EP 20 75 9172 dated Oct. 7, 2022, 2 pages.
English language abstract for DE 103 33 735 A1 extracted from espacenet.com database on Nov. 9, 2022, 1 page.
English Translation of German Office Action for Application DE 10 2013 009 815.7 dated Jun. 13, 2022, 16 pages.
Chinese Search Report for Application CN 2019800189673 dated Jan. 10, 2023, 2 pages.
English language abstract for CN 103673791 A extracted from espacenet.com database on Feb. 2, 2023, 2 pages.
English language abstract for CN 103674083 A extracted from espacenet.com database on Feb. 2, 2023, 2 pages.
English language abstract for CN 104236627 A extracted from espacenet.com database on Feb. 2, 2023, 2 pages.
English language abstract for CN 105755950 A extracted from espacenet.com database on Feb. 2, 2023, 2 pages.
Chinese Search Report for Application CN 202080028597.4 dated Oct. 20, 2022, 2 pages.
English language abstract for CN 101151179 A extracted from espacenet.com database on Nov. 23, 2022, 2 pages.
English language abstract for CN 104321673 A extracted from espacenet.com database on Nov. 23, 2022, 2 pages.
English language abstract for CN 105571620 A extracted from espacenet.com database on Nov. 23, 2022, 2 pages.
English language abstract for CN 106959077 A extracted from espacenet.com database on Nov. 23, 2022, 1 page.
English language abstract for CN 107249833 A extracted from espacenet.com database on Nov. 23, 2022, 2 pages.
English language abstract for CN 101491433 A extracted from espacenet.com database on Mar. 3, 2023, 2 pages.
English language abstract for CN 104169678 A extracted from espacenet.com database on Mar. 3, 2023, 1 page.
English language abstract for CN 104736054 A extracted from espacenet.com database on Mar. 3, 2023, 2 pages.
English language abstract for CN 107015653 A extracted from espacenet.com database on Mar. 3, 2023, 1 page.
English language abstract for CN 108852361 A extracted from espacenet.com database on Mar. 3, 2023, 1 page.
English language abstract for DE 10 2013 101 432 A1 extracted from espacenet.com database on Mar. 9, 2023, 1 page.
Chinese Search Report for Application CN 2020800285226 dated Feb. 2, 2023, 3 pages.
Chinese Search Report for Application CN 2020800286017 dated Feb. 18, 2023, 3 pages.
Chinese Search Report for Application CN 2020800285974 dated Apr. 3, 2023, 3 pages.
English language abstract and original document of HU, Wenshan, "Progress in the Research on Robot's Sensitive Skin", Journal of Hefei University of Technology, Dec. 3, 2006, 4 Pages.
Engllish language abstract and original document of Wang, Yan, "Dynamic Testing Based on FBG and Its Preliminary Application in the Artincial Skin", China Master's Theses, Information Technology Series, Feb. 1, 2016, 75 pages.

\* cited by examiner

FIBER OPTIC SYSTEM FOR DETECTING FORCES ON AND MEASURING DEFORMATION OF AN ANTHROPOMORPHIC TEST DEVICE

RELATED APPLICATIONS

This application is the National Stage of International Application No. PCT/US2019/014878, filed on Jan. 24, 2019, which claims priority to U.S. Provisional Patent Application Ser. No. 62/621,388, filed on Jan. 24, 2018, both of which are hereby incorporated by reference.

BACKGROUND

1. Field of the Invention

The present invention relates generally to anthropomorphic test devices and, more particularly, to a fiber optic system for detecting forces on and measuring deformation of an anthropomorphic test device.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle.

Collision testing often involves the use of anthropomorphic test devices (ATD), commonly referred to as "crash test dummies." During collision testing, the ATD is placed inside a vehicle and the vehicle undergoes a simulated collision (sled test) or physical collision. The collision exposes the ATD to high inertial loading, and sensors inside the ATD, such as accelerometers, strain gauges, and other sensors, generate electrical signals of data corresponding to the loading. Cables transmit these electrical signals of data to a data acquisition system (DAS) for subsequent processing. This data reveals information about the effects of the collision on the anthropomorphic test device and can be correlated to the effects a similar collision would have on a human body. Further, the ATD can be subject to static tests that are performed in testing stands instead of on sleds. In such tests, the ATD or the specific body parts of the ATD are subject to specific forces to determine the effect.

The movement and distortions of the ATD during a crash test have been monitored visually using high speed cameras in the past. However, some tests cannot be monitored in this way because of the construction of the structure surrounding the ATD, the presence of other devices, or the inflation of air bags. Also, the position or shape of individual parts of the ATD may be difficult to estimate, such as limbs and internal organs. Simulated soft organs are particularly difficult to monitor using traditional strain gauges where it is difficult to measure strain of low Young modulus materials using high Young modulus sensing elements.

To develop skeletal structures, organs, or flesh of the ATD, it is necessary to create or form shapes and materials to adjust for various possible stiffness, which the human body can have in different regions or components. To adjust these components, it is only possible to do this by changing geometry or using different materials, and adjusting as close as possible to the material stiffness requirement. These systems are time consuming to set-up and only represent certain aspect of the human body when subjected to forces.

SUMMARY

The present invention provides a system for detecting forces on and measuring deformation of an anthropomorphic test device (ATD). The systems includes a plurality of body parts and at least one optical fiber supported by and in contact with at least one of the body parts. The body parts form the ATD and simulate at least a part of a human body and the articulation of the human body. The optical fiber extends between a first end and a second end and comprises a plurality of sensors disposed between the ends. An emitter is in communication with the optical fiber for emitting a light having a predetermined band of wavelengths through the optical fiber that is reflected by the sensors and an interrogator is in communication with the optical fiber for detecting the reflected light from the sensor such that changes to the reflected light indicate a strain on the at least one body part.

In addition, the present invention provides an anthropomorphic test device comprising a plurality of body parts and at least one optical fiber wrapped around the at least one body part of the ATD and an interrogator communicating with the at least one optical fiber to record a strain of the at least one component.

Further, the present invention includes an anthropomorphic test device (ATD) that comprises a rib cage assembly having a plurality of ribs and a plurality of optical fibers extending around the ribs. Each of the ribs have a first component with inner and outer surfaces, and the first component is formed of a rigid material. The rigid material has a groove in one of the surfaces. A second component is supported on the inner surface of the first component and the second material is a flexible material. Each of the plurality of optical fibers are in direct contact with one of the surfaces of the rib for sensing stain thereon.

The subject invention also provides a control box for receiving signals from at least one sensor located within at least one optical fiber detecting forces on a body part of an anthropomorphic test device (ATD). The control box is capable of withstanding impacts to the ATD. The control box comprises a base, side panels and end panels secured to the base, and a top secured thereto defining an enclosure. A power supply is disposed within the enclosure and a controller is disposed within the enclosure and mounted to one of the end panels and connected to the power supply. A plurality of interrogators are disposed within the enclosure and mounted to one of the side panels and in communication with the controller. A plurality of ports are supported in the top for connecting to each of the optical fibers and to the interrogators. A plurality of emitters are disposed within the enclosure and operatively communicate with the ports for emitting a light having a predetermined band of wavelengths through the optical fiber to be reflected by the sensors and detected by the interrogator such that changes to the reflected light indicate a strain on the at least one body part.

One advantage of the new fiber optic measurement system is that it measures stress, strain, and deformation of skeletal structures, organs, and flesh for the ATD to form components, which can vary in structure, material, and shape all at the same time. Yet another advantage of the present invention is that the fiber optic measurement system measures structural strains and stress, and shapes, to increase biofidelity of all ATDs in use today and in the future. Still another advantage of the present invention is that the fiber optic measurement system permits for better vehicle restraint evaluations to predict possible injury. Existing measurement systems rely on individual load cells placed within the ATD and the metal structure of the ATD inhibits the ability to take measurements with such load cells. The fiber optic measurement system can be routed through areas that current load cells cannot be placed. Further, the optical fibers are capable of being threaded through the metal structure to provide a complete analysis of the forces acting on the ATD. Other existing systems rely on images taken by cameras at discrete points of impact which require substantial calculations and extrapolation to determine the forces. The subject invention overcomes these inaccuracies and provides measurements in real time.

Other features and advantages of the present invention will be readily appreciated, as the same becomes better understood, after reading the subsequent description taken in conjunction with the accompanying drawings.

DETAILED DESCRIPTION

Figure 1:
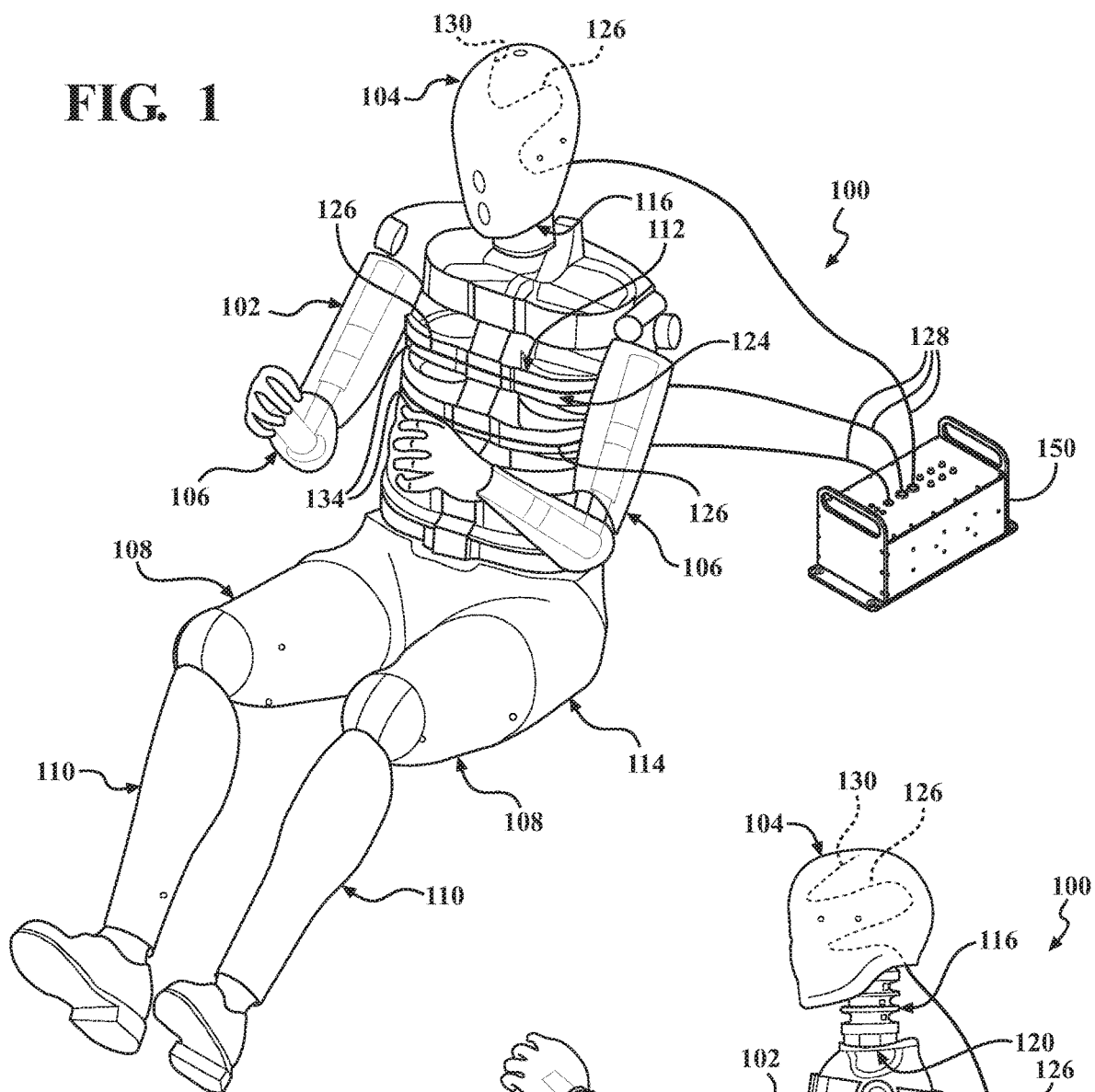
FIG. 1 is a perspective view of one embodiment of a system for detecting forces on and measuring deformation of an anthropomorphic test device.
Figure 2:
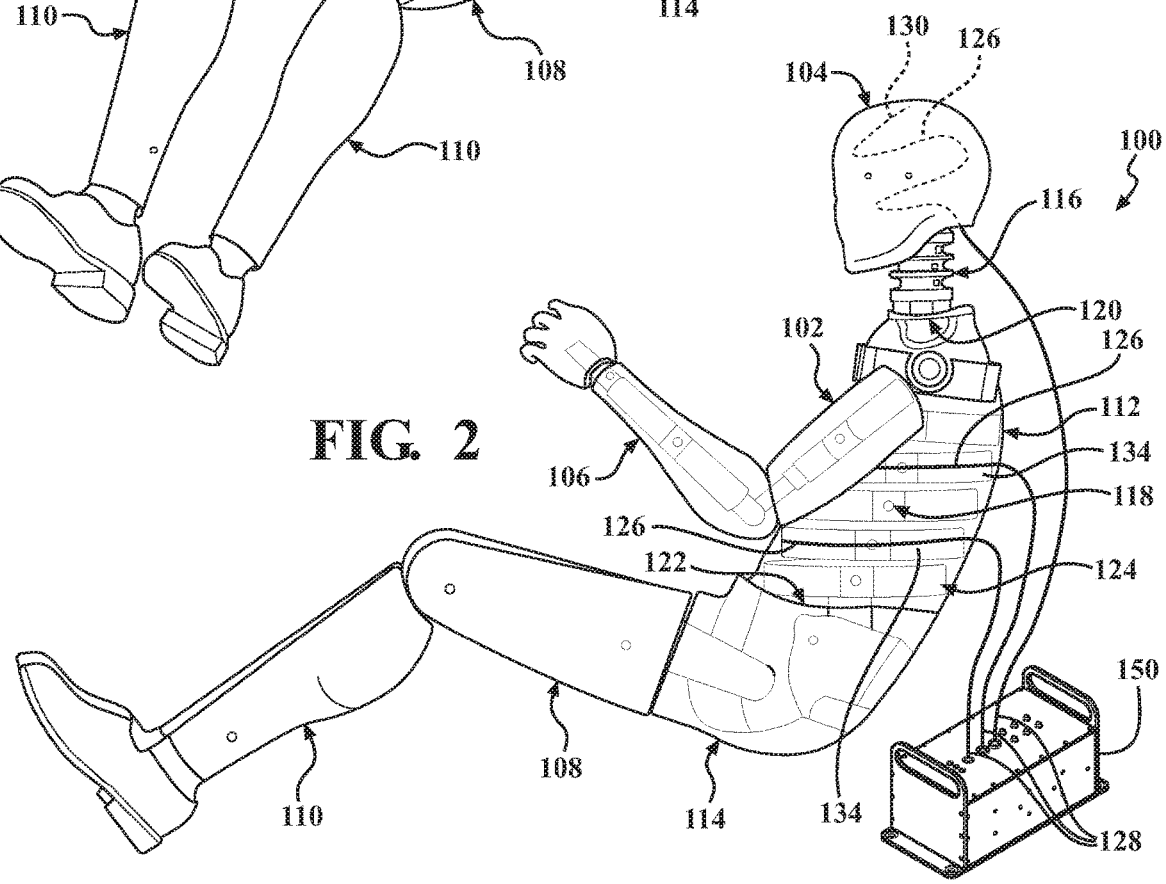
FIG. 2 is a side view of the system for measuring and detecting forces on an anthropomorphic test device illustrated in FIG. 1.

Referring to the drawings and in particular FIGS. 1 and 2, one embodiment of a system 100 for measuring and detecting forces on an anthropomorphic test device 102, according to the present invention, is shown. The ATD 102, in the example shown, is of a fiftieth percentile (50%) male type and is illustrated in a sitting position. It should be appreciated that the subject invention would apply to all types and sizes of ATDs 102.

In one embodiment, the ATD 102 is used primarily to test the performance of automotive interiors and restraint systems 100 for adult front and rear seat occupants. The size and weight of the ATD 102 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. The ATD 102 can also be used to test the force of impacts on a simulated human body directly in various testing stands, such as neck twist fixtures, chest impact fixtures, and the like.

The system 100 includes a plurality of body parts forming the anthropomorphic test device and simulates at least a part of a human body and articulation thereof. The body parts typically include a rigid body part and a flexible body part. Rigid body parts of the ATD 102 are meant to mimic and/or simulate rigid body parts of a human body, such as bone. Flexible body parts are meant to mimic and/or simulate flexible body parts of the human body, such as flesh, muscle, tissue, organs, and the like. The ATD 102 combines rigid and flexible body parts to more accurately represent the human body and articulation thereof. For example, an arm assembly includes the rigid body part corresponding to the bones and the flexible body part corresponding to the flesh, muscle, and tissue. Referring to the flexible body parts, it should be appreciated that various materials, such as a urethane or plastic can be used to form the flexible body parts for improved coupling with the rigid body parts of the anthropomorphic test device.

As shown generally in FIG. 1, the ATD 102 includes a head assembly 104, a right and left arm assembly 106, a right and left upper leg assembly 108, a right and left lower leg assembly 110, a thorax assembly 112, and a pelvis assembly 114. An instrumentation core (not shown) may be mounted within the various body parts and may be removable for access to the body part. It should be appreciated that the right and left assemblies are generally constructed in a similar manner. It is to be appreciated by one of ordinary skill in the art that the individual components forming the ATD 102 are well known and can be varied based on the particular ATD 102 without deviating from the subject invention.

FIG. 2 shows a neck assembly 116 that connects the head assembly 104 to the thorax assembly 112. The thorax assembly 112 also includes a spine assembly 118 having an upper end 120 mounted to the head assembly 104 and a lower end 122 extending into a torso area of the anthropomorphic test device. The thorax assembly 112 also includes a rib cage assembly 124 connected to the spine assembly 118.

Referring again to FIGS. 1 and 2, at least one optical fiber 126 is supported by and in contact with at least one of the body parts. The optical fiber 126 extends between a first end 128 and a second end 130 and comprises a plurality of sensors 132 disposed between the ends. In FIGS. 1 and 2, optical fibers 126 are shown wrapped around ribs 134 of the rib cage assembly 124 and the head assembly 104. In other embodiments, the optical fiber 126 mounts directly to a surface 186 of the body part or is embedded within the body part. It is to be appreciated that embedding the optical fiber 126 can be achieved by various methods as such as by molding or casting the body part around the optical fiber 126. It is also possible that the body part could be 3D printed about the optical fiber 126 or vice versa.

Figure 3:
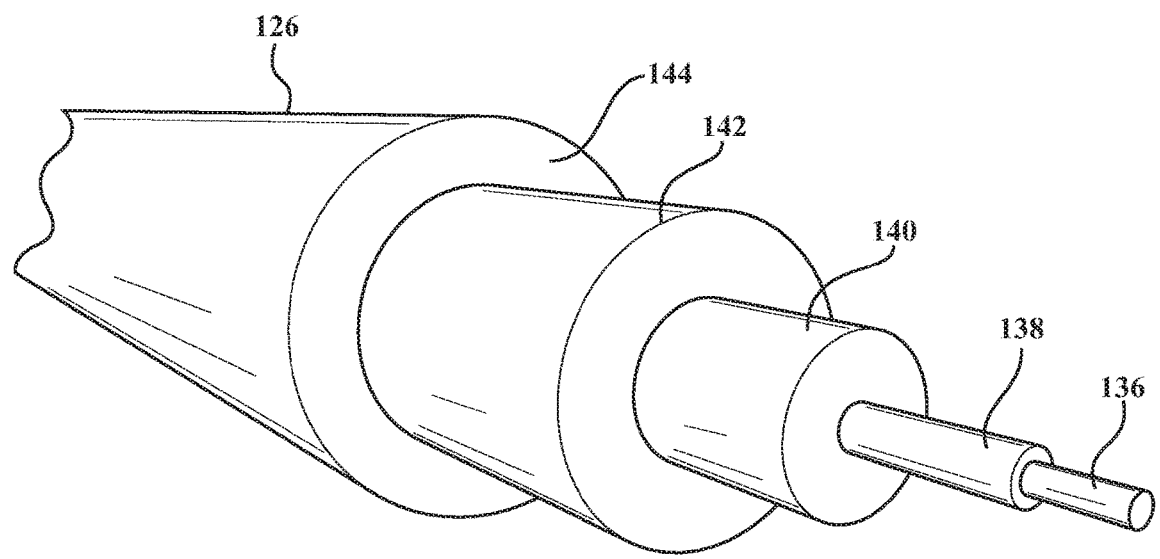
FIG. 3 is a cross-sectional perspective view of one exemplary optical fiber according to the subject invention.

Referring to FIG. 3, one exemplary optical fiber 126 is shown in cross-sectional perspective view. The optical fiber 126 includes a core 136 that is surrounded by a cladding material 138. A coating 140 material surrounds the cladding material 138 to provide strength to the core 136 and cladding material 138. Optimally, a strength member 142 and an outer jacket 144 may also surround the coating 140 to provide additional strength to the optical fiber 126. However, it is to be appreciated that the various layers may vary based on the particular body part and specific application. In one embodiment, the optical fiber 126 has a diameter of from 100 to 300 microns. The core 136 would typically have a diameter of less than 30 microns, and particularly from 5-20 microns. One preferred optical fiber 126 has a core 136 with a diameter of about 8 microns. The cladding material 138 is typically about 75-200 microns and particularly from 100-150 microns. In another embodiment, the optical fiber 126 has a diameter of from 100 to 200 microns. The optical fiber 126 can be sized for the particular body part and/or the forces to be detected. One common diameter for the optical fiber 126 is about 75-150 microns.

Figure 4:
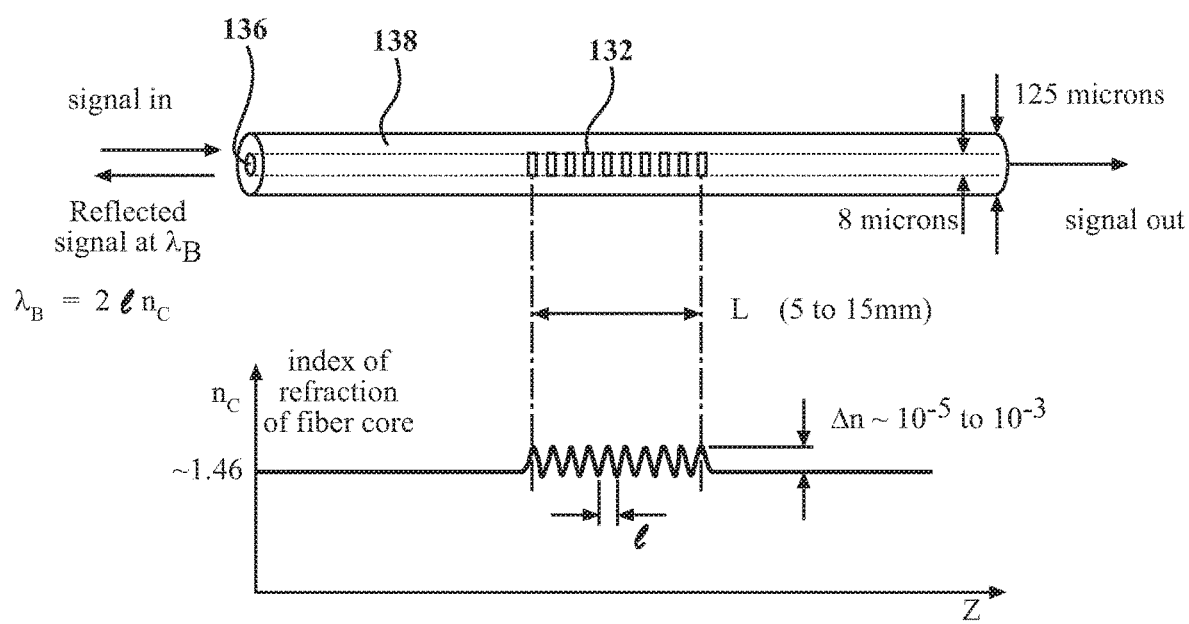
FIG. 4 is a schematic view of an optical fiber with sensors for use with the subject invention.

Referring to FIG. 4, a schematic of the optical fiber 126 is shown having one sensor 132, which is a Fiber Bragg Grating. The optical fiber 126 can have at least 3 sensors 132 disposed between the ends. The number of sensors 132 can be selected based on the particular body part and/or the forces to be detected. For example, the optical fiber 126 can have from 7 to 25 sensors 132 disposed between the ends and up to 70 sensors 132. As illustrated in FIG. 4, the light is directed down the core 136 and is reflected by the Fiber Bragg Grating as is understood by those of ordinary skill in the art. The sensor has a length L and the light has a wavelength $\ell$. The core has an index of refraction, $n_c$ that is selected for the particular application. It is well known to one of ordinary skill in the optical fiber arts to correlate the reflected light from the sensor using the wavelength $\ell$, length L, and index of refraction $n_c$. For certain body parts, the sensors 132 may be disposed equidistance from one another along the optical fiber 126 and about the body part. For other body parts, the sensors 132 may be more closely located to one another.

Figure 5:
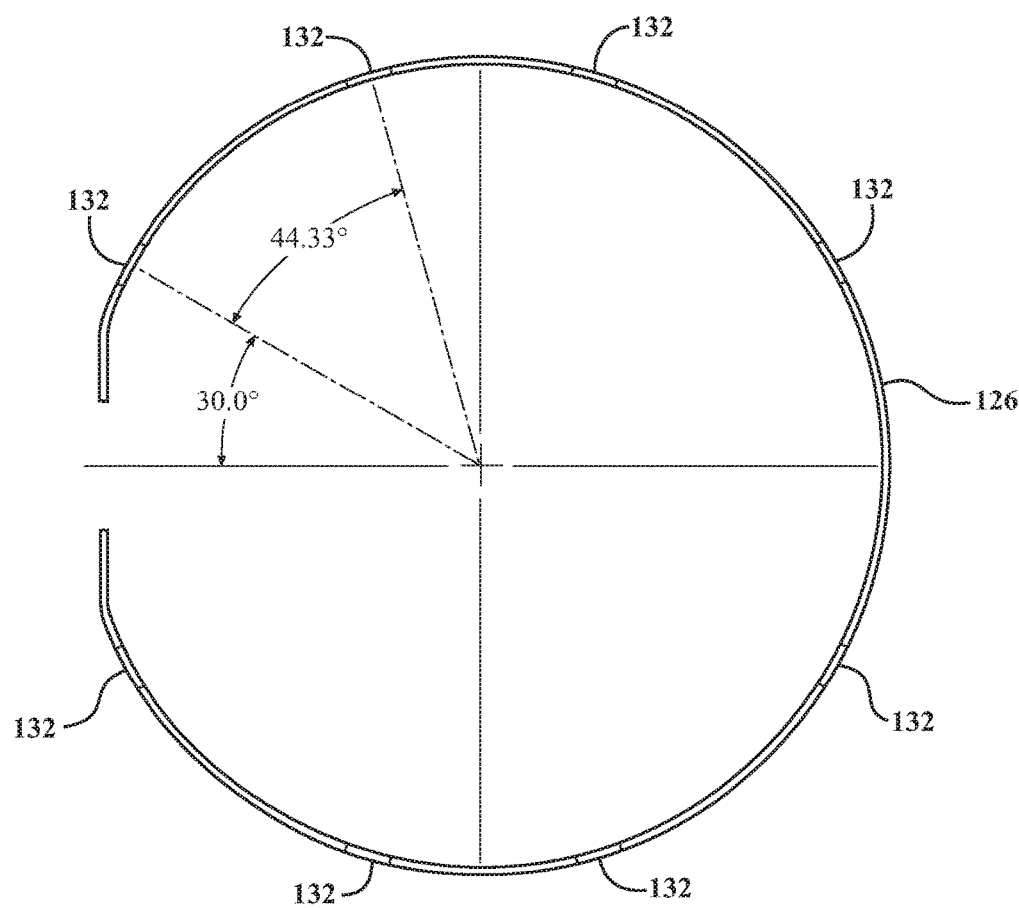
FIG. 5 is a schematic view of the optical fiber and relative locations of sensors along the optical fiber.

In the embodiment shown in FIG. 5, the locations of the sensors 132 are spaced along length of the optical fiber 126 when positioned around the body part, such as the rib 134, is shown. Specifically, there are 8 sensors 132 spaced along the optical fiber 126 and each sensor 132 is about 44.33 degrees from one another. The length of the sensor 132 is approximately 6 millimeters and there are about 51.44 millimeters between the eight sensors 132.

Figure 6:
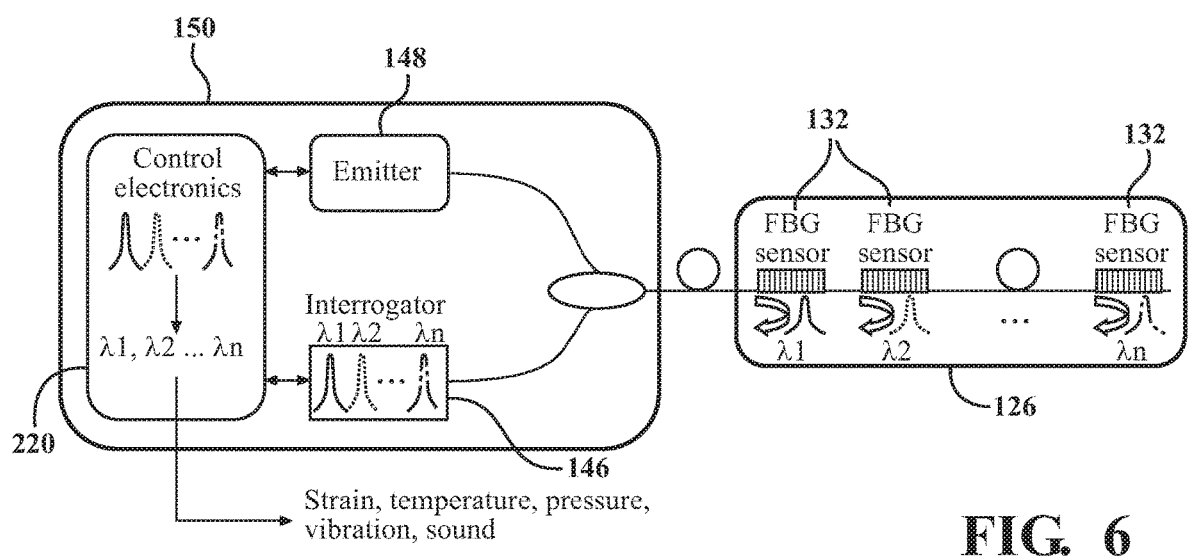
FIG. 6 is a schematic view of an optical fiber in communication with a control box according to the subject invention.

Referring to FIG. 6, the subject invention also includes an interrogator 146 communicating with the optical fiber 126 and an emitter 148 in communication with the optical fiber 126 for emitting a light having a predetermined band of wavelengths through the optical fiber 126 that is reflected by the sensors 132. The subject invention may enclose the interrogator 146 and the emitter 148 within a control box (shown generally at 150 in FIGS. 1 and 2). The control box 150 may also house a controller 220. The emitter 148 emits the light having a predetermined band wavelength that is from 50 to 450 nanometers. In one embodiment, the wavelength band can be in the range of 1510-1595 nanometers. In another embodiment, the wavelength band can be in the range of 1275-1345 nanometers.

The interrogator 146 detects the reflected light from the sensor 132 such that changes to the reflected light indicate a strain on the at least one body part. The detection of strain could be provided by Fiber Bragg Gratings (FBGs), Brillouin scattering, Rayleigh scattering, interferometers, or any other optical technique as is known to those of skill in the art. The control box 150 is coupled to the optical fiber 126 and the light from the emitter 148 is reflected by the sensors 132. The reflected light can be used to determine the forces, such as strain, experienced by the body part and determine the amount of deformation to the body part. In other words, when the optical fiber 126 is placed on the body part in an initial condition, the sensors 132 reflect a certain pattern of the light. When forces are applied to the body part, the optical fiber 126 is subjected to stress or strain which causes the sensors 132 to undergo a change, such as by expanding or contracting. Expanding or contracting the sensors 132 change the reflected light pattern. As one example, the changes in the reflected light pattern are detected, which can then be compared to known changes to determine the amount of deformation of the body part. The forces that are applied may deform the body part and/or the optical fiber 126. The forces may also include changes within the environment, such as temperature or pressure, which may cause changes to the optical fiber 126 sufficient to alter the reflected light pattern.

The interrogator 146 can receive signals from up to 70 sensors 132. The interrogator 146 may have a sample rate limit of approximately twenty (20) kHz for eight (8) channels and one (1) MHz for single channels. The integrator may have four (4) channels with eight (8) sensors 132 per channel. One example of a suitable interrogator 146 for the subject invention is available from Ibsen Photonics as I-MON 512. It should be appreciated that, once the reflected signal is received, the interrogator 146 may store or transmit the data for subsequent data processing.

Figure 7A:
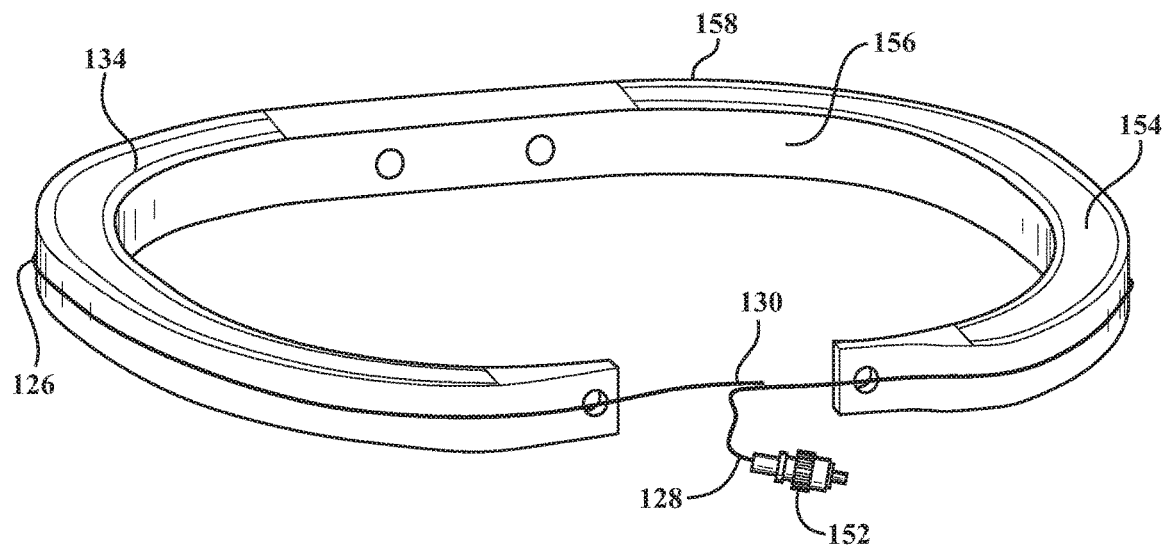
FIG. 7A is a perspective view of one embodiment of a rib having an optical fiber wrapped therearound.
Figure 7B:
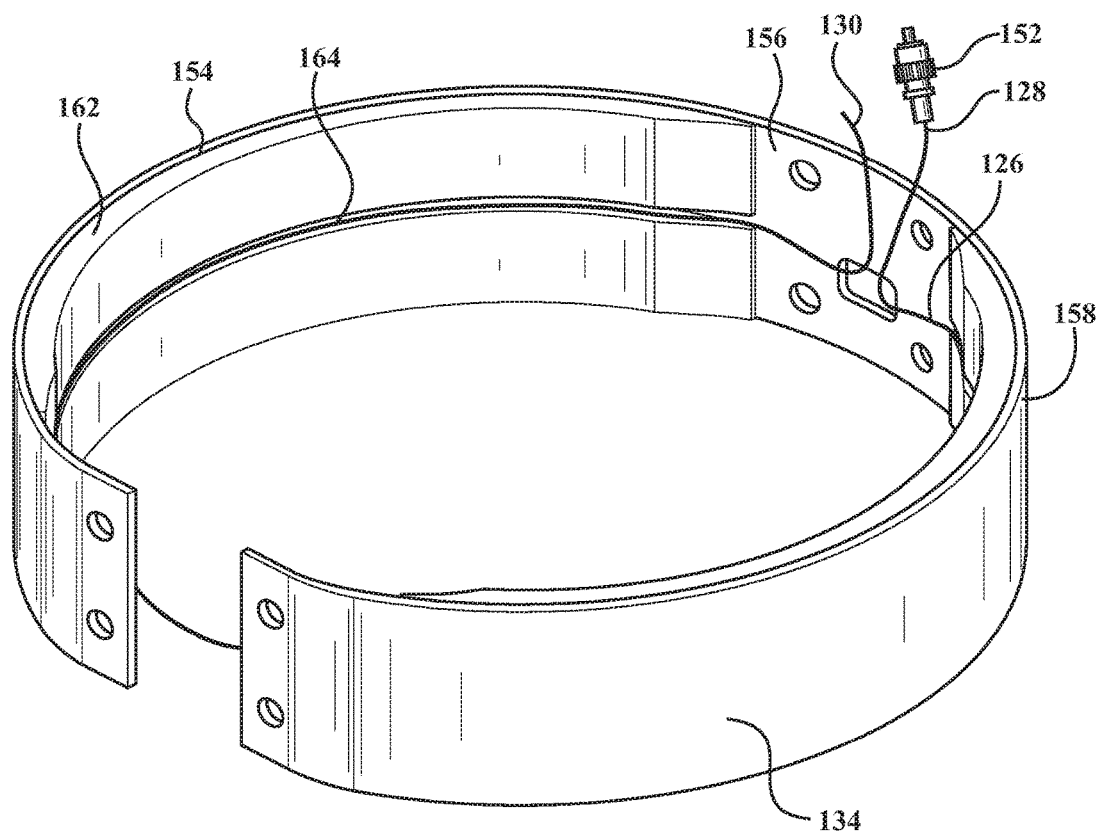
FIG. 7B is a perspective view of another embodiment of a rib having an optical fiber wrapped therearound.

Referring to an embodiment shown in FIG. 7A, the optical fiber 126 is wrapped around the rib 134. The optical fiber 126 includes a connector 152 mounted to the first end 128 for connecting to the control box 150. Typically, the ATD 102 includes at least one rib 134 having a first component 154 with inner and outer surfaces 156, 158. However, the rib 134 can also be tested as a standalone body part to determine the response to various impacts. The optical fiber 126 directly contacts the rib 134 for sensing stain thereon. The first component 154 may be formed of a rigid material. Referring to FIG. 7B, the rib 134 comprises a second component 162 supported on the inner surface 156 of the first component 154 and the second material is a flexible material that has a groove 164 for receiving the optical fiber 126.

Figure 8:
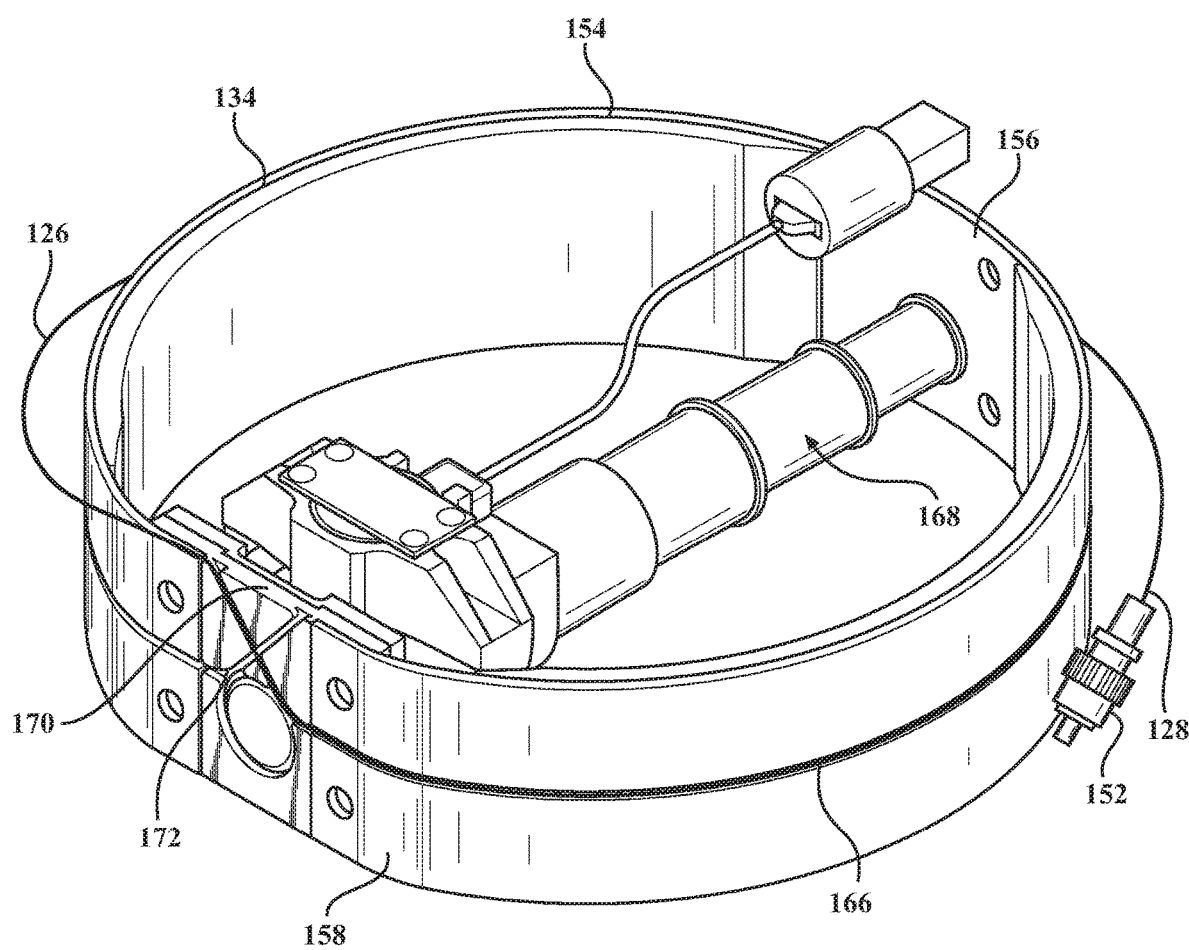
FIG. 8 is a perspective view of yet another rib having an optical fiber supported thereon.
Figure 9:
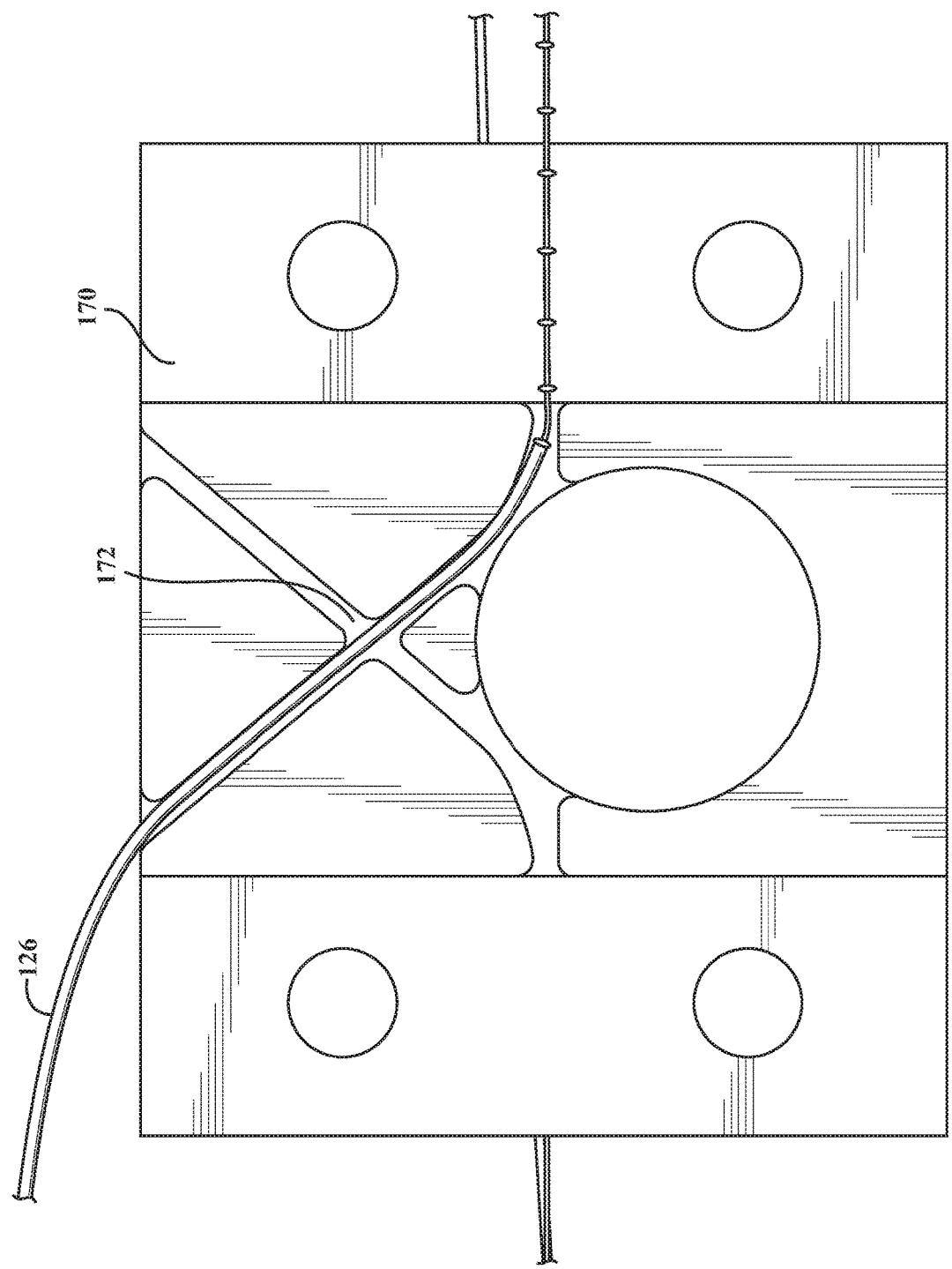
FIG. 9 is a perspective view of a mounting bracket for the rib shown in FIG. 8.

With reference to FIG. 8, another embodiment of the rib 134 is shown having a groove 166 in the outer surface 158 of the first component 154. An Infra-Red Telescoping Rod for the Assessment of Chest Compression (IR-TRACC 168) is shown mounted within the rib 134. The IR-TRACC 168 is supported by a mounting bracket 170 and the inner surface 156 of the first component 154. FIG. 9 is a perspective view of the mounting bracket 170, which includes a channel 172 for receiving and locating the optical fiber 126 relative to the rib 134 and the IR-TRACC 168.

Figure 10:
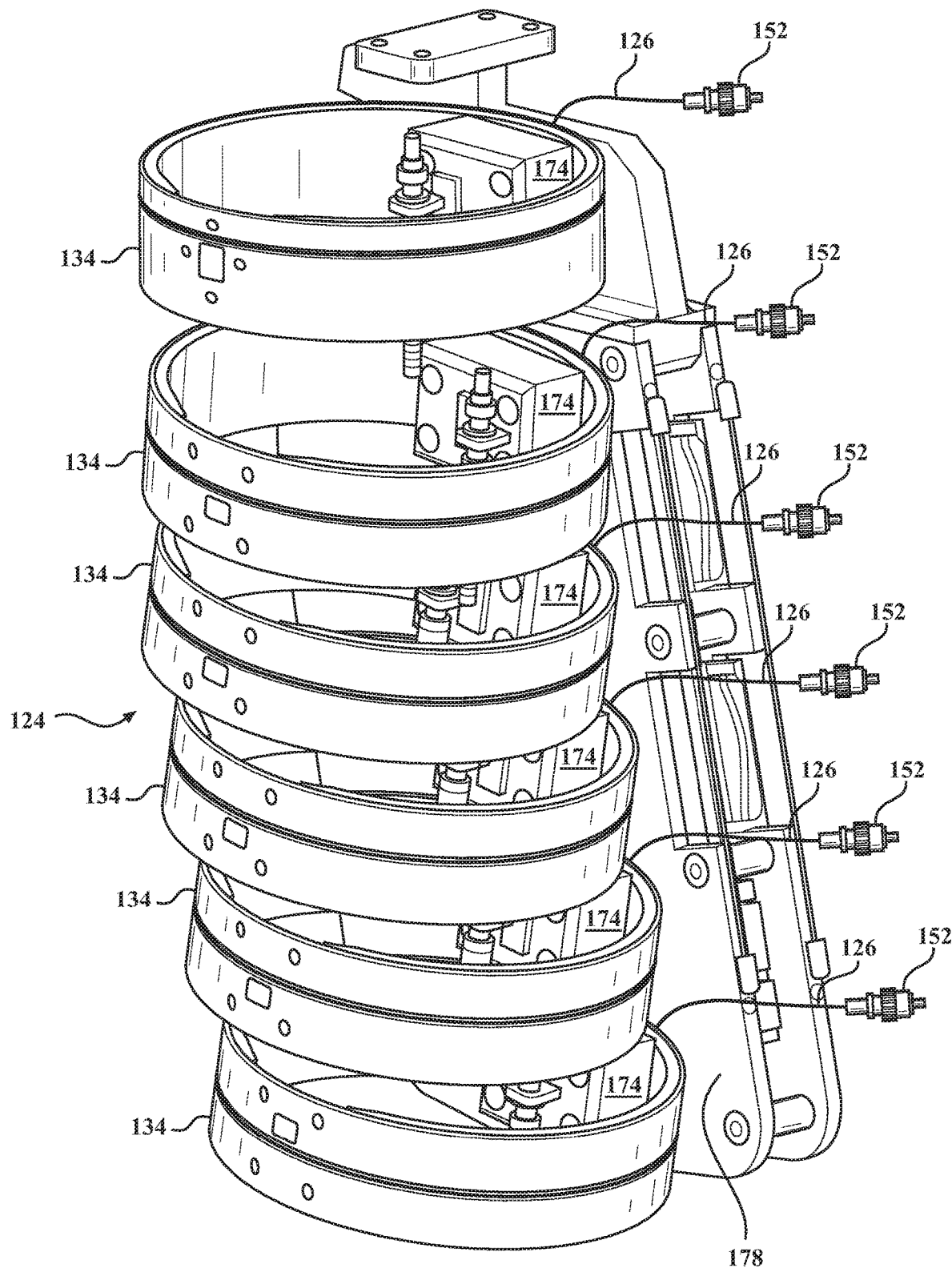
FIG. 10 is a perspective view of a rib cage assembly having a plurality of ribs and a plurality of optical fibers extending therearound according to the subject invention.
Figure 11:
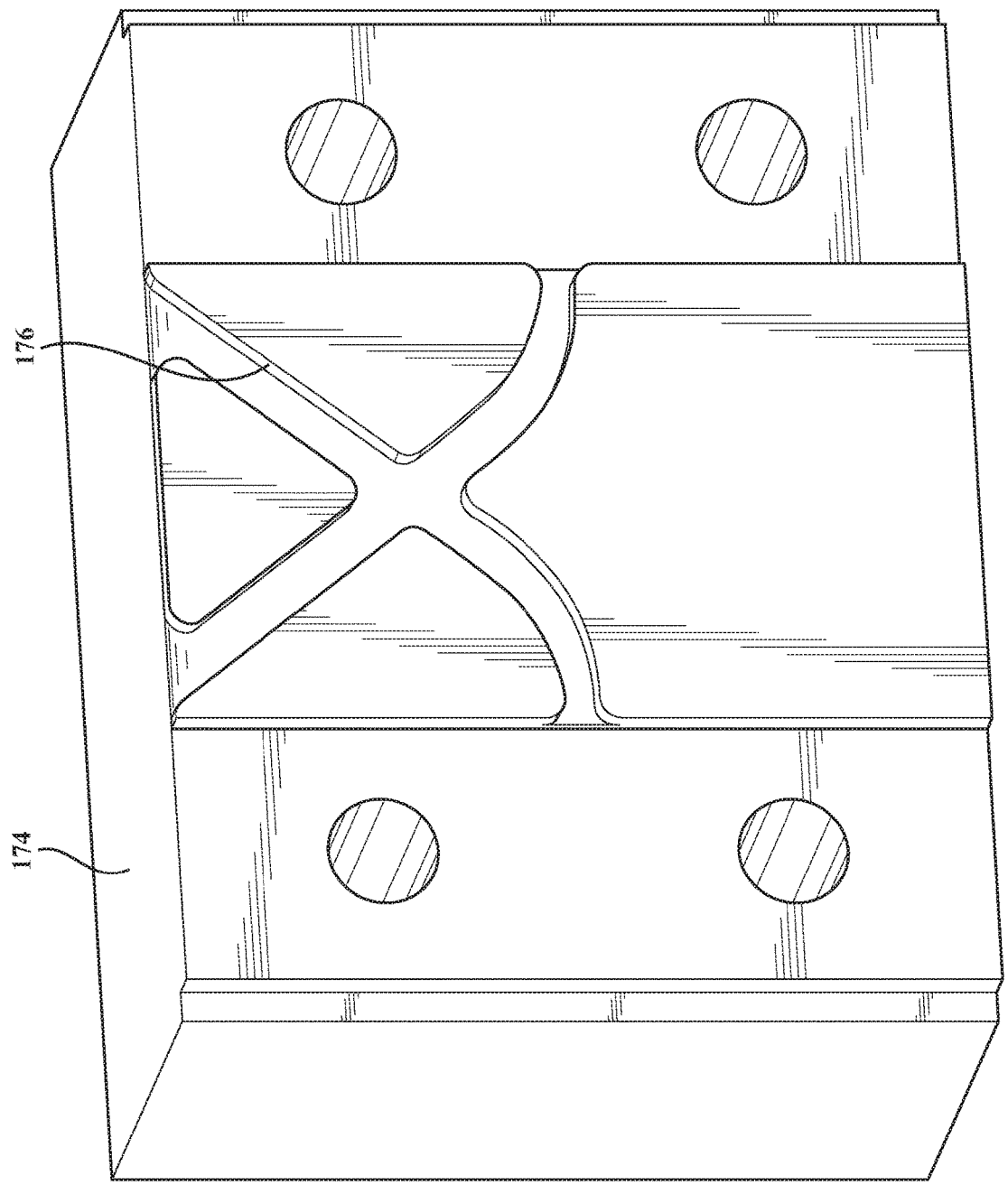
FIG. 11 is a perspective view of a mounting bracket that supports the ribs of FIG. 10 relative to a spine fixture.

FIG. 10 is a perspective view of the rib cage assembly 124. The rib cage assembly 124 typically includes a plurality of ribs 134 and a plurality of optical fibers 126, wherein each of the plurality of ribs 134 receives one of the plurality of optical fibers 126 extending therearound. As shown in FIG. 10, the rib cage assembly 124 includes six ribs 134 and six optical fibers 126 mounted to a spine fixture 178 by a mounting bracket 174. FIG. 11 is a perspective view of the mounting bracket 174 that supports the rib 134 relative to the spine fixture 178. Each of the mounting brackets 174 has a channel 176 for receiving and locating the optical fiber 126.

Figure 12:
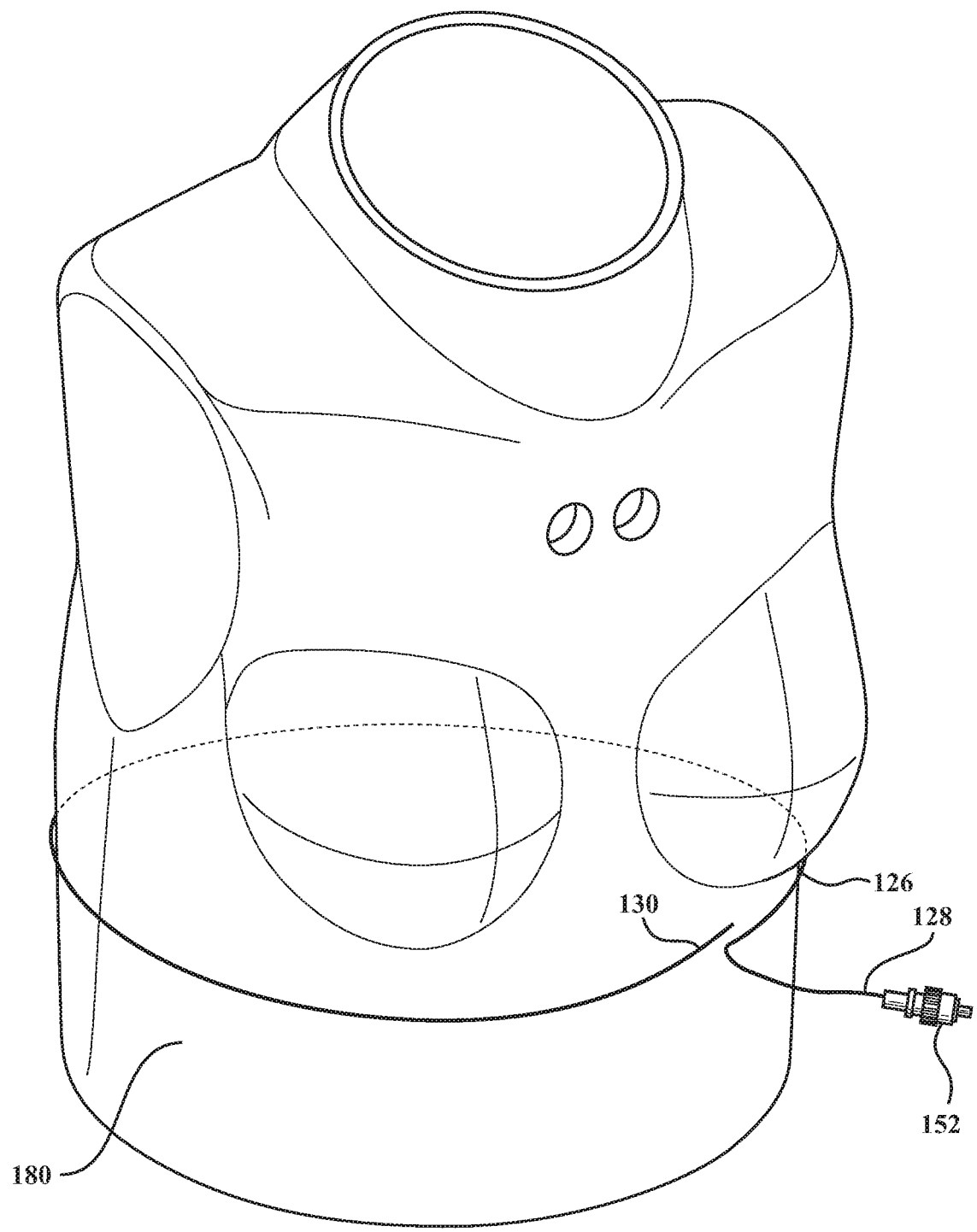
FIG. 12 is an enlarged perspective view of the system having the optical fiber embedded within a flexible body part.
Figure 13:
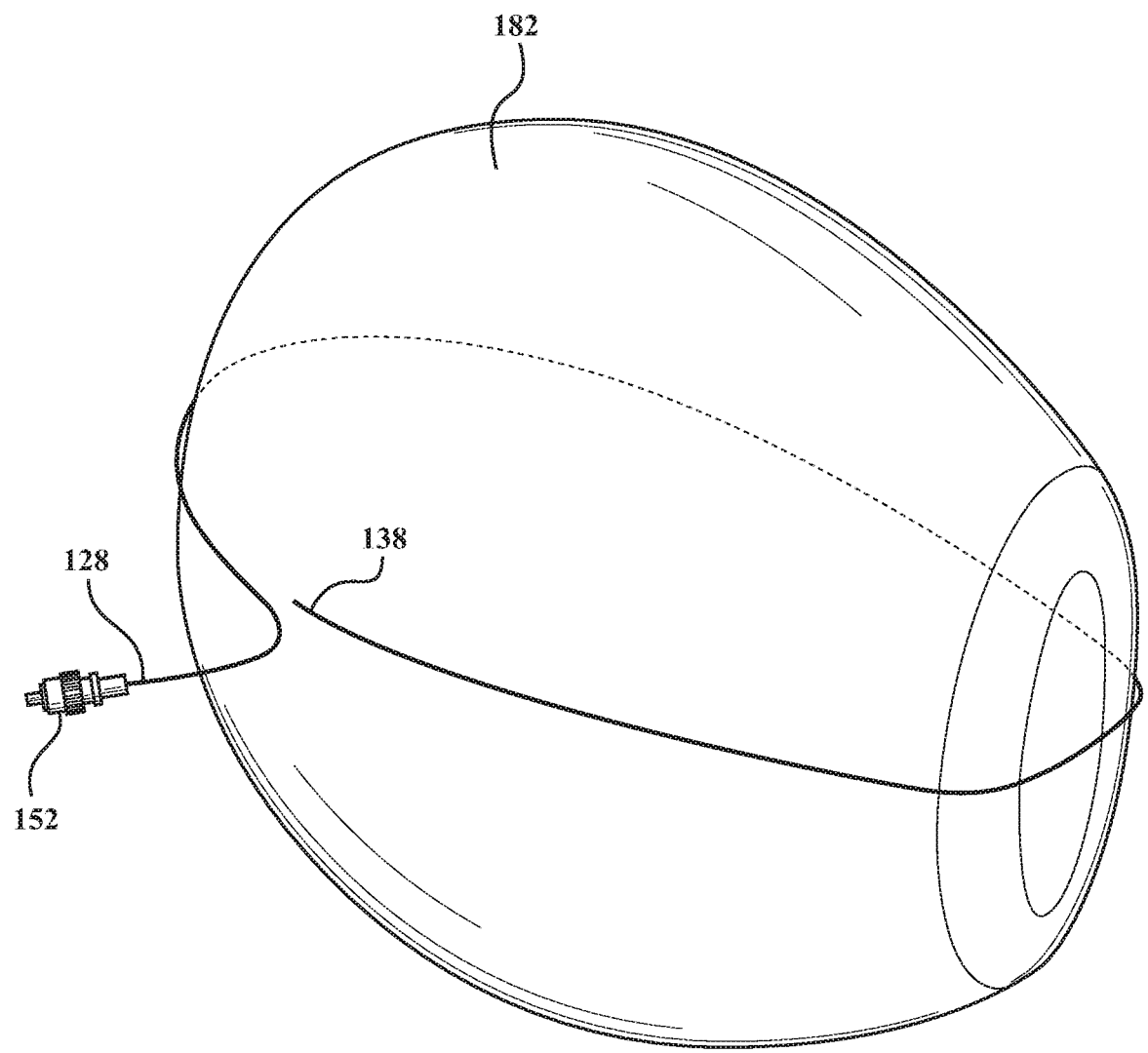
FIG. 13 is an enlarged perspective of one embodiment of a optical fiber wrapped around an organ of the ATD.

Referring to FIG. 12, another embodiment is shown having the optical fiber 126 in contact with the flexible body part, such as the flesh of the abdomen 180. In yet another embodiment illustrated in FIG. 13, the optical fiber 126 is wrapped around an organ 182 of the ATD 102. Alternatively, the optical fiber 126 may be embedded within the flexible body part, such as the organ 182. It is typical that the ATD 102 will be outfitted with an organ bag to simulate the soft organs of a human body. The optical fiber 126 can also be incorporated into the organ bag in a similar fashion.

Figure 14:
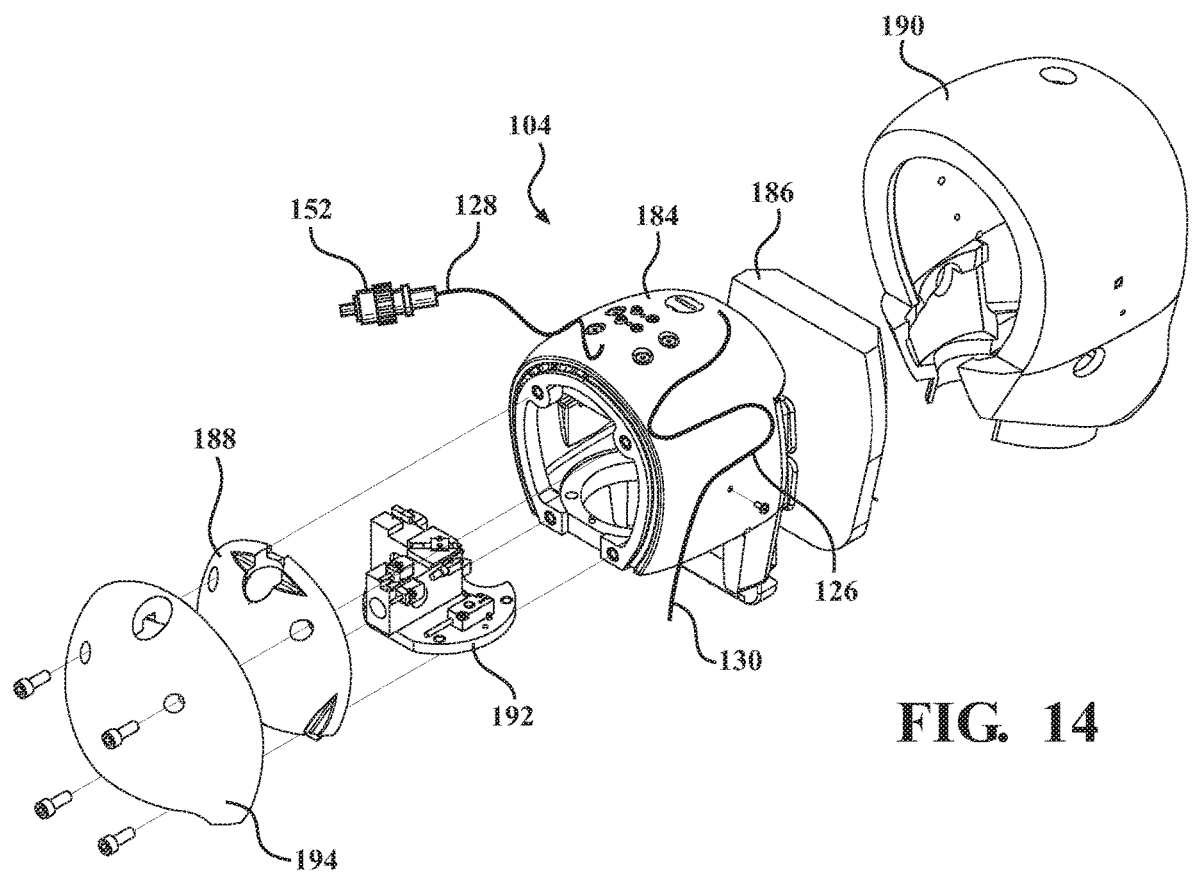
FIG. 14 is an exploded perspective view of a head assembly of the ATD shown in FIG. 1.
Figure 15:
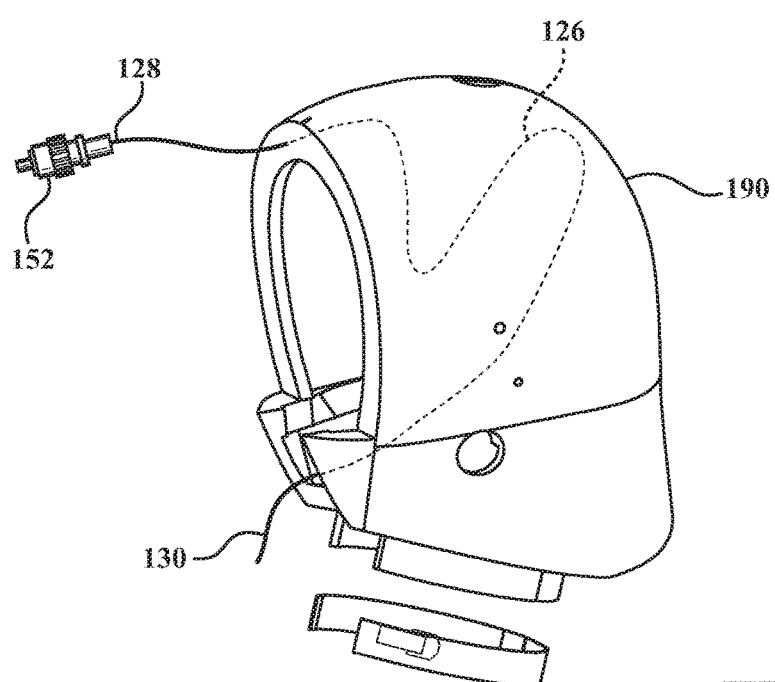
FIG. 15 is a perspective view of a flexible skin assembly for the head assembly shown in FIG. 14 having the optical fiber embedded therein.

Referring to FIG. 14, an exploded perspective view of the head assembly 104 is shown. The head assembly 104 includes a skull assembly 184, a face foam 186, a head cap 188, a skin assembly 190, an accelerometer assembly 192, and cap skin 194. The optical fiber 126 is shown mounted to the surface of the skull assembly 184. The optical fiber 126 may be adhesively bonded to the surface or the skull assembly 184 may be grooved for receiving the optical fiber 126. As one example, M-Bond AE-10 is a suitable adhesive for use with the subject invention. The skull assembly 184 is typically a rigid material. FIG. 15 shows an embodiment having the optical fiber 126 embedded within the flexible skin assembly 190.

Figure 16:
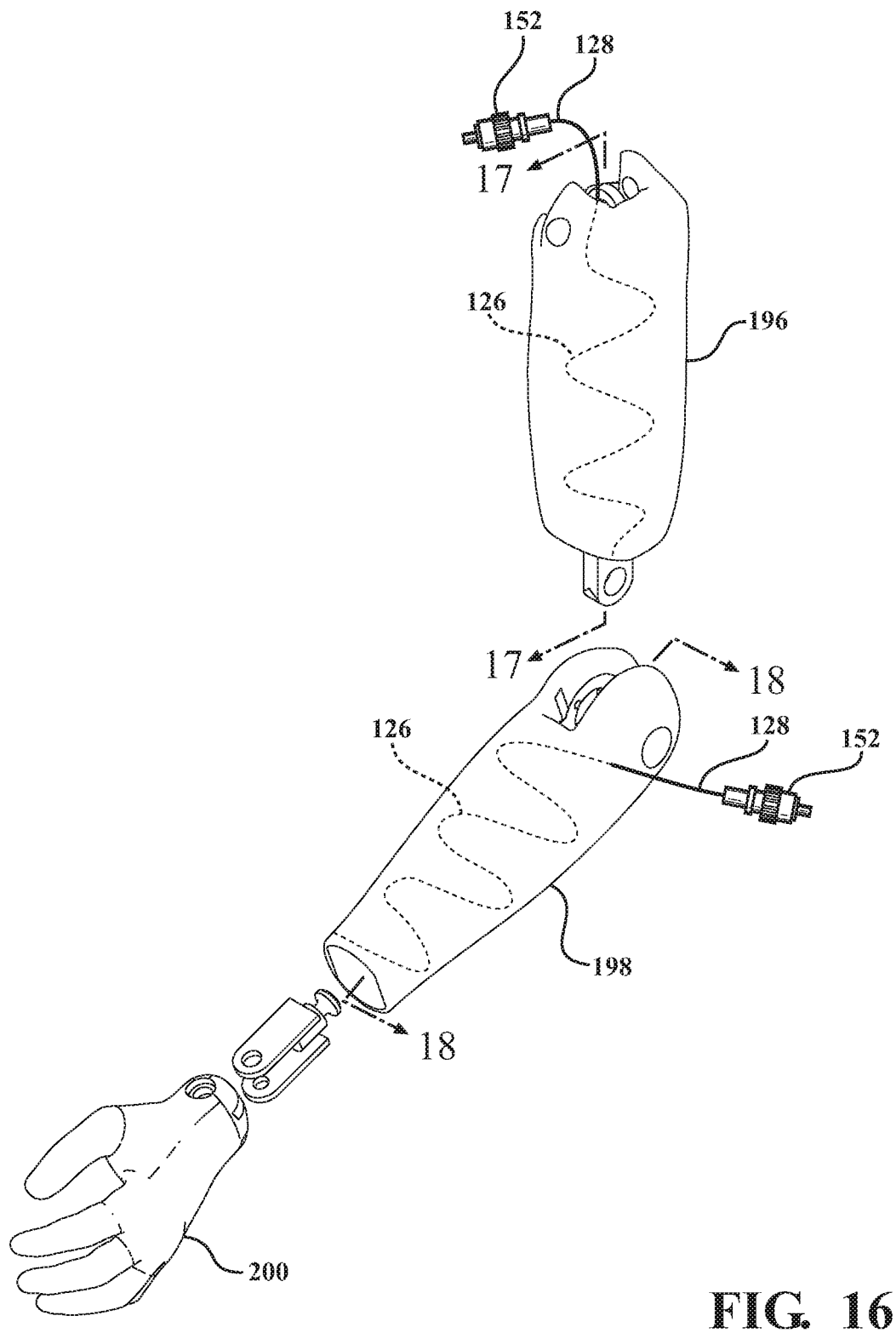
FIG. 16 is an exploded perspective view of an arm assembly of the ATD shown in FIG. 1.
Figure 17:
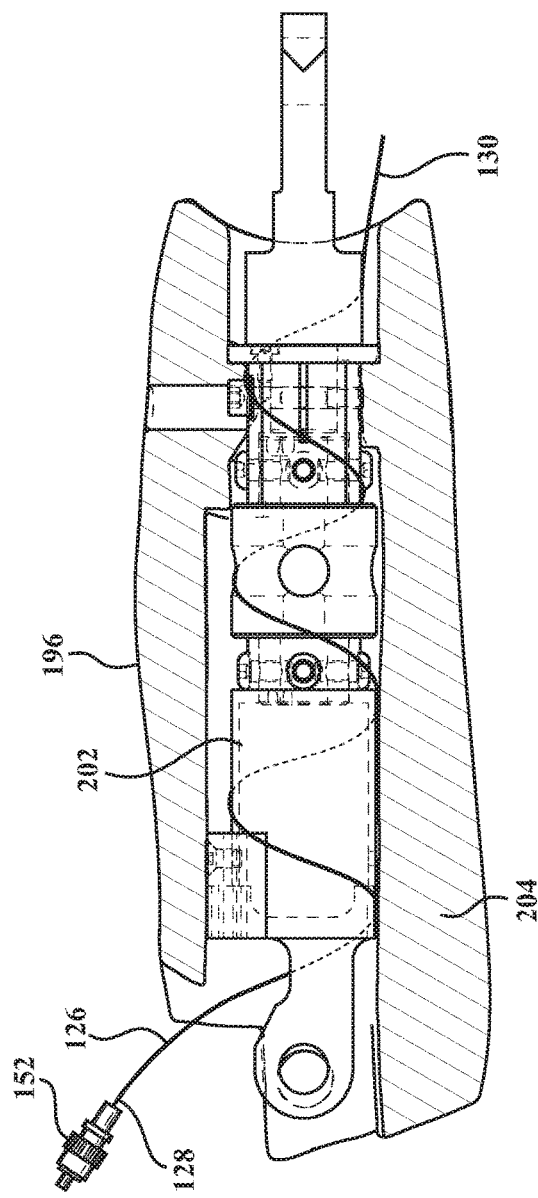
FIG. 17 is a cross-sectional view of an upper arm assembly of the ATD shown in FIG. 1.
Figure 18:
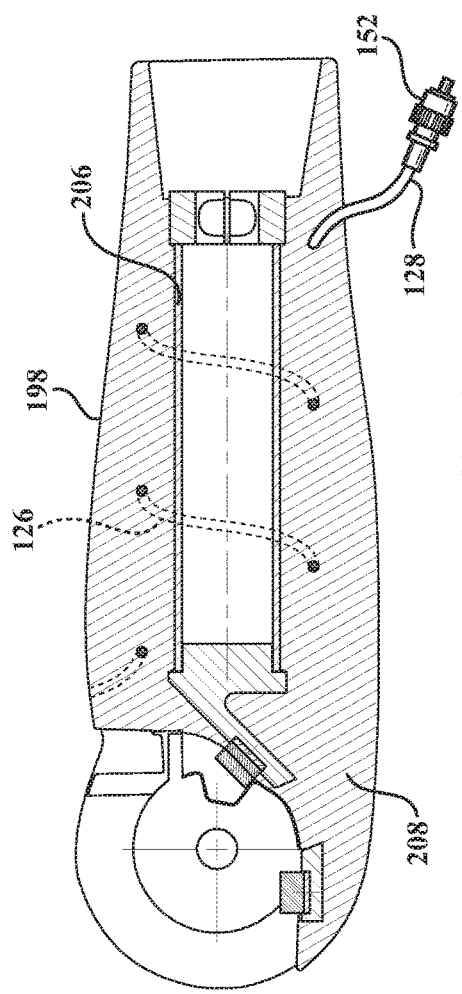
FIG. 18 is a cross-sectional view of the lower arm assembly of the ATD shown in FIG. 1.

With reference to FIG. 16, an exploded perspective view of the arm assembly of the ATD 102 is shown having upper and lower arm assemblies 196, 198 and a hand assembly 200. FIG. 17 is a cross-sectional view of the upper arm assembly 196 having rigid inner components 202 and a flexible skin 204 surrounding the inner components 202. The optical fiber 126 is helically wrapped around the inner components 202 to detect strain thereon. FIG. 18 is a cross-sectional view of the lower arm assembly 198 having rigid inner components 206 and flexible skin 208 surrounding the inner components 206. The optical fiber 126 is helically embedded within the skin 208.

Figure 19:
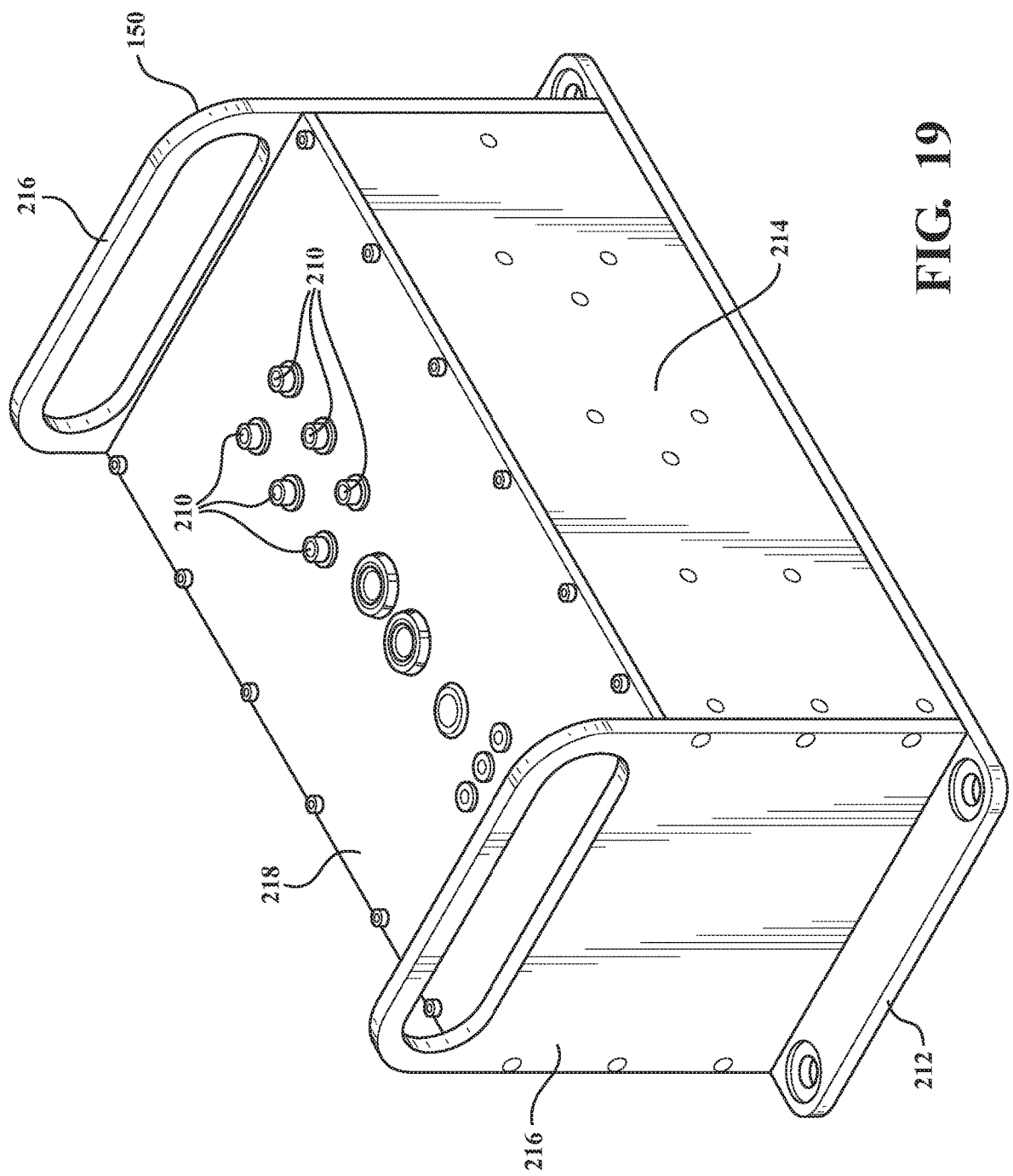
FIG. 19 is a perspective view of one embodiment of a control box according to the subject invention for connecting to the optical fibers.
Figure 20:
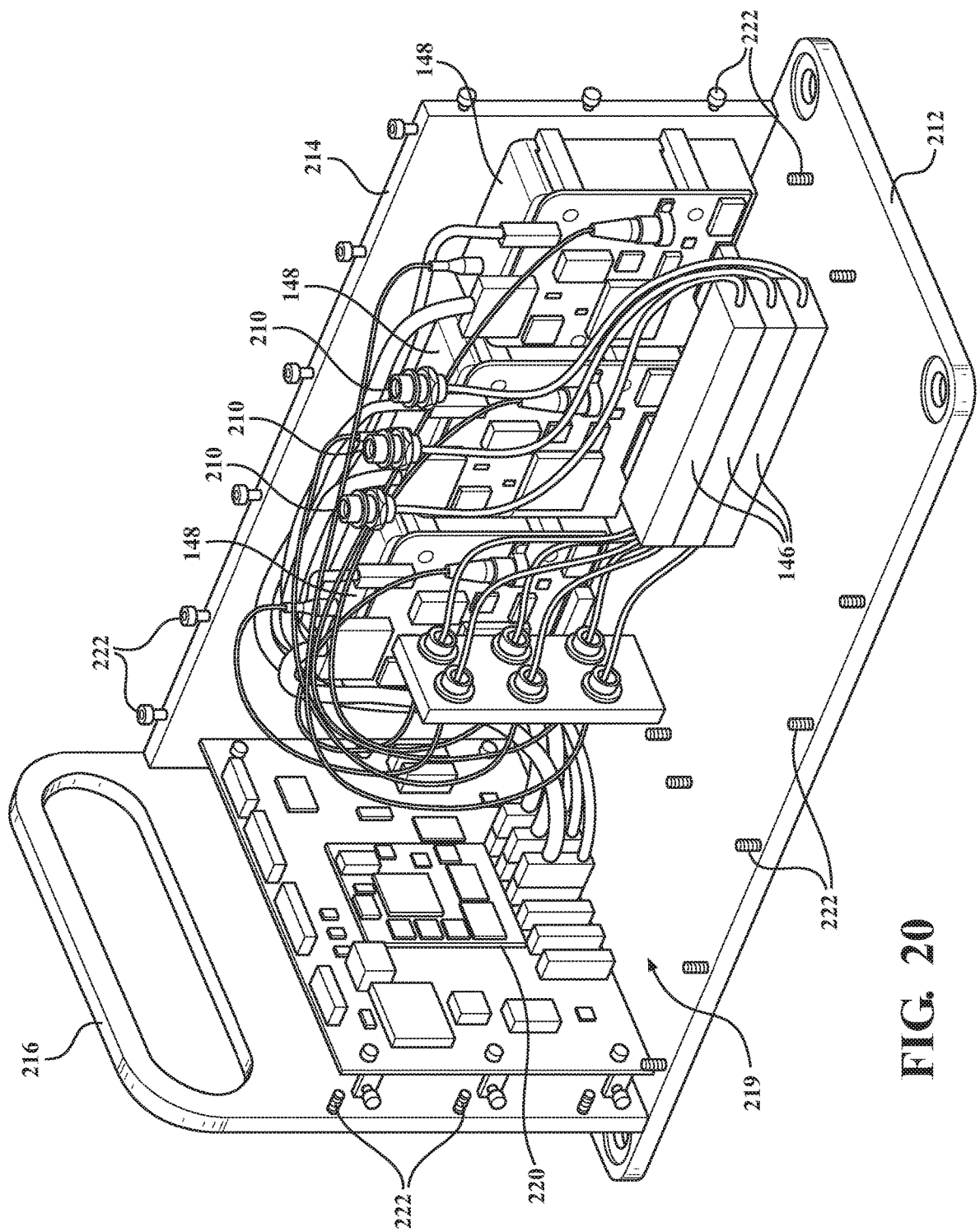
FIG. 20 is a partial perspective view of the control box of FIG. 19.

Referring to FIG. 19, a perspective view of the control box 150 is shown. The control box 150 houses the interrogator 146 and the emitter 148 and has at least one port 210 for connecting the at least one optical fiber 126 thereto. The control box 150 is typically mounted on the test sled along with the ATD 102 and therefore, the control box 150 must be capable of withstanding impacts to the anthropomorphic test device. The control box 150 includes a base 212, side panels 214 and end panels 216 secured to the base 212, and a top 218 secured thereto defining an enclosure 219. Referring to FIG. 20, a partial perspective view of the control box 150 is shown having the top 218 and one side 214 and end 216 removed. A controller 220 is disposed within the enclosure 219 and mounted to one of the end panels 216 and the plurality of interrogators 146 are disposed within the enclosure and mounted to one of the base 212 or the side panels 214 and in communication with the controller 220. The plurality of ports 210 are supported in the top 218 to allow for connecting to each of the optical fibers 126. The plurality of emitters 148 are disposed within the enclosure and operatively communicate with the ports 210 for emitting a light having the predetermined band of wavelengths through the optical fiber 126 to be reflected by the sensors 132 and detected by the interrogator 146 such that changes to the reflected light indicate a strain on the at least one body part. A plurality of fasteners 222 secure the base 212, top 218, sides 214 and ends 216 together to reinforce the control box 150 for withstanding repeated impacts. The control box 250 can be formed from various materials that are strong enough and lightweight enough to withstand impacts to the ATD 102. Suitable materials include, aluminum, titanium, steel, and reinforced plastics.

Figure 21:
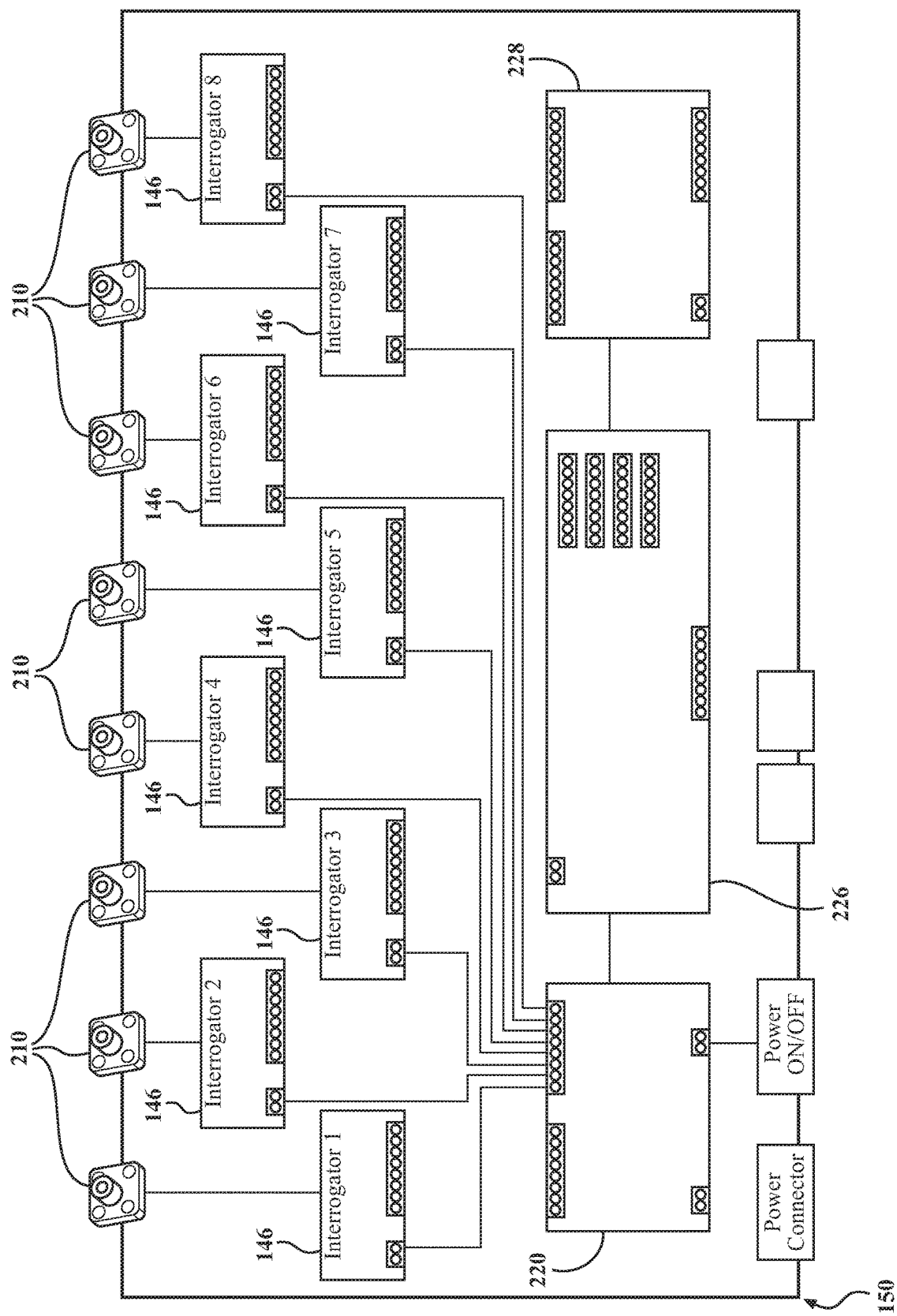
FIG. 21 is a schematic of the control box of FIG. 19.

FIG. 21 is a schematic view of another embodiment of the control box 150 and includes a power supply 224 disposed within the enclosure. The control box 150 can support up to eight interrogators 146 connected to individual ports 210 for connecting eight optical fibers 126. The control box 150 may also include a communication hub 226. For example, in one embodiment, the communication hub 226 can include an Ethernet port that may be used to transfer the data from the interrogator 146 to the computer for processing. In another embodiment, the communication hub 226 can wirelessly communicate stored data to the computer for further processing. Any computer capable of processing the data typically includes a program containing a calculation algorithm to calculate the deformation of the at least one body part based on the curvature of the optical fiber 126, which can be derived from the measured strain, to reconstruct the deformed shape and compare its shape at any time to its original shape. Such programs are available from the National Highway Traffic Safety Administration (NHTSA) or other third parties. The control box 150 further includes storage media 228 to store the data, such as RAM, ROM, flash memory, EEPROM, hard disk drive, solid state drive, or any other suitable device.

In operation, the fiber optic measurement system 100 is disposed about the at least one body part as described above. During impact, when the optical fiber 126 of the system 100 bends along with the body part, the strain due to the bending is sensed as a function of the reflected light from the sensor 132 with the interrogator 146, and then it is recorded and stored by the controller 220 and/or storage media 228. The curvature of the optical fiber 126 can be derived from the measured strain, therefore the deformed shape can be reconstructed. This allows the subject invention to compare the impacted shape at any time to its original shape to calculate the deformation. This stored data is then uploaded to the computer (not shown) for processing, and the processed data reveals the effects of the test collision on the ATD 102. It should be appreciated that these effects can help predict the effects of a similar collision on an actual human body.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A system for detecting forces on an anthropomorphic test device during a collision test where the system experiences a sudden impact causing deformation in a short time span, said system comprising:
   a plurality of body parts forming the anthropomorphic test device and simulating at least a part of a human body and articulation thereof;
   at least one optical fiber mounted directly to a surface of or embedded within at least one of said body parts, said optical fiber extending between a first end and a second end and comprising a plurality of Fiber Bragg Grating sensors disposed between said ends;

an emitter in communication with said optical fiber for emitting a light having a predetermined band of wavelengths through said optical fiber that is reflected by said Fiber Bragg Grating sensors;

an interrogator in communication with said optical fiber for detecting said reflected light from said Fiber Bragg Grating sensor such that changes to the reflected light indicate a strain on said at least one body part; and wherein the sudden impact results in deformation of said at least one body part causing strain on said optical fiber that stretches and compresses said Fiber Bragg Grating sensors in deformed areas thereby changing the reflection of the light used to generate deformation information corresponding to deformation of said at least one body part supporting said optical fiber.

2. A system as set forth in claim 1 wherein said optical fiber is adhesively bonded to a surface of said body part.

3. A system as set forth in claim 1 wherein said body part has a groove for locating and receiving said optical fiber.

4. A system as set forth in claim 1 further comprising a mounting bracket having a channel for receiving and locating said optical fiber relative to said body part and for supporting said body part.

5. A system as set forth in claim 1 wherein said body part is further defined as a rib cage assembly comprising at least one rib having a first component with inner and outer surfaces, said first component being formed of a rigid material, and wherein said optical fiber directly contacts said first component for sensing strain thereon.

6. A system as set forth in claim 5 wherein said rigid material has a groove for receiving said optical fiber.

7. A system as set forth in claim 5 wherein said rib comprises a second component supported on said inner surface of said first component and said second component is a flexible material that has a groove for receiving said optical fiber.

8. A system as set forth in claim 5 wherein said rib cage assembly includes a plurality of ribs and wherein said system further comprises a plurality of optical fibers, wherein each of said plurality of ribs receives one of said plurality of optical fibers extending therearound.

9. A system as set forth in claim 8 further comprising a spine assembly supporting said rib cage assembly and further comprising a plurality of mounting brackets, wherein each of said plurality of ribs is supported by one of said plurality of mounting brackets.

10. A system as set forth in claim 1 wherein said body part is further defined as a flexible body part having said optical fiber embedded therein.

11. A system as set forth in claim 1 wherein said body part is further defined as a rigid body part having said optical fiber mounted directly to a surface thereof.

12. A system as set forth in claim 1 wherein said optical fiber has at least 3 sensors disposed between said ends.

13. A system as set forth in claim 1 wherein said optical fiber has from 7 to 25 sensors disposed between said ends.

14. A system as set forth in claim 1 wherein said sensors are disposed equidistance from one another within said optical fiber and about said body part.

15. A system as set forth in claim 1 further comprising a connector mounted to said first end of said optical fiber and further comprising a control box housing said interrogator and said emitter and having at least one port for connecting said at least one optical fiber thereto.

16. An anthropomorphic test device that is subjected to a collision test and experiences a sudden impact causing deformation in a short time span, said anthropomorphic test device comprising:

a rib cage assembly comprising a plurality of ribs having a first component with inner and outer surfaces, said first component being formed of a rigid material and having a groove in one of said surfaces and a second component supported on said inner surface of said first component and said second component is a flexible material; and a plurality of optical fibers, wherein each of said plurality of ribs receives one of said plurality of optical fibers in said respective groove and said optical fiber extends therearound and each of said optical fibers extend between a first end and a second end and comprises a plurality of Fiber Bragg Grating sensors disposed between said ends; and wherein the sudden impact results in deformation of said plurality of ribs causing strain on said optical fibers that stretch and compress said Fiber Bragg Grating sensors in deformed areas thereby changing the reflection of the light used to generate deformation information corresponding to deformation of said ribs supporting said optical fibers in direct contact with one of said surfaces.

17. An anthropomorphic test device as set forth in claim 16 further comprising a spine assembly supporting said rib cage assembly and further comprising a plurality of mounting brackets, wherein each of said plurality of ribs is supported by one of said plurality of mounting brackets and said mounting brackets having a channel for receiving and locating said optical fiber relative to said rib.

18. A control box for receiving signals from at least one sensor located within at least one optical fiber detecting forces on a body part of an anthropomorphic test device, said control box being mounted on a test sled and apart from the anthropomorphic test device and being capable of withstanding repeated impacts to the anthropomorphic test device, said control box comprising:

a base, side panels and end panels secured to said base, and a top secured thereto defining an enclosure;

a power supply disposed within the enclosure;

a controller disposed within the enclosure and mounted to one of said end panels and connected to said power supply;

a plurality of interrogators disposed within the enclosure and mounted to one of said base and said side panels and in communication with said controller and, a plurality of ports supported in said control box for connecting to each of the optical fibers; and a plurality of emitters disposed within said enclosure and operatively communicating with said ports for emitting a light having a predetermined band of wavelengths through the optical fiber to be reflected by the sensors and detected by said interrogator such that changes to the reflected light indicate a strain on said at least one body part.

19. A system for detecting forces during a collision test on at least one of a vehicle, a testing stand, and/or an anthropomorphic test device where the system experiences a sudden impact causing deformation in a short time span, said system comprising:

a plurality of components having inner and outer surfaces and forming a part of at least one of the vehicle, the testing stand, and/or the anthropomorphic test device with at least one component formed of a rigid material having a groove on a surface of said component or formed of a flexible material;

at least one optical fiber mounted directly within said groove of said component or embedded within said component formed of said flexible material, said optical fiber extending between a first end and a second end and comprising a plurality of Fiber Bragg Grating sensors disposed between said ends;

an emitter in communication with said optical fiber for emitting a light having a predetermined band of wavelengths through said optical fiber that is reflected by said Fiber Bragg Grating sensors;

an interrogator in communication with said optical fiber for detecting said reflected light from said Fiber Bragg Grating sensor such that changes to the reflected light indicate a strain on said component; and wherein the sudden impact results in deformation of said plurality of components causing strain on said optical fiber that stretches and compresses said Fiber Bragg Grating sensors in deformed areas thereby changing the reflection of the light used to generate deformation information corresponding to deformation of said components supporting said optical fiber.

20. A system as set forth in claim 19 wherein said optical fiber is adhesively bonded to one of said inner and said outer surfaces of said component.

21. A system as set forth in claim 19 wherein said component is formed of a flexible material that has a groove for receiving said optical fiber.

22. A system as set forth in claim 19 wherein said optical fiber has at least 3 sensors disposed between said ends.

23. A system as set forth in claim 19 wherein said optical fiber has from 7 to 25 sensors disposed between said ends.

* * * * *